United States Patent
Oh et al.

(10) Patent No.: US 10,101,629 B2
(45) Date of Patent: Oct. 16, 2018

(54) OPTICAL MODULATOR INCLUDING LIQUID CRYSTAL, DRIVING METHOD THEREOF, AND OPTICAL DEVICE USING THE SAME

(71) Applicant: SAMSUNG DISPLAY CO., LTD., Yongin, Gyeonggi-Do (KR)

(72) Inventors: Soo Hee Oh, Hwaseong-si (KR); Yoon Kyung Park, Seoul (KR); Kyung Ho Jung, Seongnam-si (KR); Seung Jun Jeong, Hwaseong-si (KR); Moon Jung Baek, Seoul (KR); Hyun Seung Seo, Anyang-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 571 days.

(21) Appl. No.: 14/620,110

(22) Filed: Feb. 11, 2015

(65) Prior Publication Data

US 2016/0054599 A1  Feb. 25, 2016

(30) Foreign Application Priority Data

Aug. 25, 2014  (KR) ......................... 10-2014-0110867

(51) Int. Cl.
   *G09G 3/36*  (2006.01)
   *G02F 1/137*  (2006.01)
   (Continued)

(52) U.S. Cl.
   CPC ........... *G02F 1/137* (2013.01); *G02B 5/1828* (2013.01); *G02B 27/2214* (2013.01);
   (Continued)

(58) Field of Classification Search
   CPC ....... G02F 1/1337; G02F 2001/133742; G02F 1/134336; G02F 1/137; G02F 1/292;
   (Continued)

(56) References Cited

U.S. PATENT DOCUMENTS 7,872,694 B2  1/2011  Im
8,305,550 B2  11/2012  Jung et al.
(Continued)

FOREIGN PATENT DOCUMENTS

KR  10-0810308 B1  3/2008
KR  10-2009-0004006 A  1/2009
(Continued)

OTHER PUBLICATIONS

EPO Search Report dated Jan. 26, 2016, for corresponding European Patent application 15156958.9, (15 pages).
(Continued)

*Primary Examiner* — Amr Awad
*Assistant Examiner* — Aaron Midkiff
(74) *Attorney, Agent, or Firm* — Lewis Roca Rothgerber Christie LLP

(57) ABSTRACT

An optical modulation device or an optical device including the same includes: a first plate and a second plate facing the first plate; and a liquid crystal layer between the first plate and the second plate and including a plurality of liquid crystal molecules, wherein the first plate includes a plurality of first electrodes and a first aligner, the second plate includes at least one second electrode and a second aligner, and an alignment direction of the first aligner is substantially parallel to an alignment direction of the second aligner and wherein portions of the first plate, the second plate, and the liquid crystal layer between the first and second plates are individual units.

18 Claims, 32 Drawing Sheets

(51) Int. Cl.
*G02F 1/1343* (2006.01)
*G02F 1/1337* (2006.01)
*G02F 1/29* (2006.01)
*G02B 5/18* (2006.01)
*G02B 27/22* (2018.01)

(52) U.S. Cl.
CPC ...... *G02F 1/1337* (2013.01); *G02F 1/134336* (2013.01); *G02F 1/292* (2013.01); *G09G 3/3696* (2013.01); *G02F 2001/13373* (2013.01); *G02F 2001/133742* (2013.01); *G02F 2001/134381* (2013.01); *G09G 2300/0426* (2013.01)

(58) Field of Classification Search
CPC .......... G02F 2001/13373; G02F 2001/134381; G09G 3/3696; G09G 2300/0426; G02B 5/1828; G02B 27/2214
USPC .............................. 345/87–104; 349/139–152
See application file for complete search history.

(56) References Cited

U.S. PATENT DOCUMENTS

| | | | |
|---|---|---|---|
| 8,305,551 B2 | 11/2012 | Son | |
| 8,531,646 B2 | 9/2013 | Shi et al. | |
| 2006/0119927 A1* | 6/2006 | Matsuki | G02F 1/1393 359/315 |
| 2009/0008723 A1* | 1/2009 | Schmidt | H01L 21/26586 257/409 |
| 2009/0073331 A1 | 3/2009 | Shi et al. | |
| 2014/0104262 A1* | 4/2014 | Miyake | G09G 3/3696 345/212 |
| 2014/0320793 A1* | 10/2014 | Hirosawa | G02F 1/1337 349/132 |
| 2014/0368481 A1* | 12/2014 | Tomikawa | G09G 3/3614 345/205 |

FOREIGN PATENT DOCUMENTS

| | | |
|---|---|---|
| KR | 10-2009-0065934 A | 6/2009 |
| KR | 10-2011-0077709 A | 7/2011 |
| KR | 10-2011-0114017 A | 10/2011 |
| WO | WO 2008/126049 A1 | 10/2008 |
| WO | WO 2009/072670 A1 | 6/2009 |

OTHER PUBLICATIONS

Brown, C V., et al, *Optical diffraction from a liquid crystal phase grating*, Journal of Applied Physics, American Institute of Physics, vol. 91, No. 6, Mar. 15, 2002, pp 3495-3500, XP012055981.

Shi, L., et al, *Dynamics of a liquid-crystal variable optical prism based on Pancharatnam phase*, Applied Optics, Optical Society of America, vol. 49, No. 6, Feb. 20, 2010, pp. 976-985, XP001552186.

Shi, L, et al., Liquid crystal optical phase plate with a variable in-plane gradient, Journal of Applied Physics, Aug. 7, 2008, pp. 033109-1-033109-7, vol. 104, American Institute of Physics.

McManamon, P.F. et al., A Review of Phased Array Steering for Narrow-Band Electrooptical Systems, Proceedings of the IEEE, Jun. 2009, pp. 1078-1096, vol. 97 No. 6, IEEE, U.S.A.

* cited by examiner

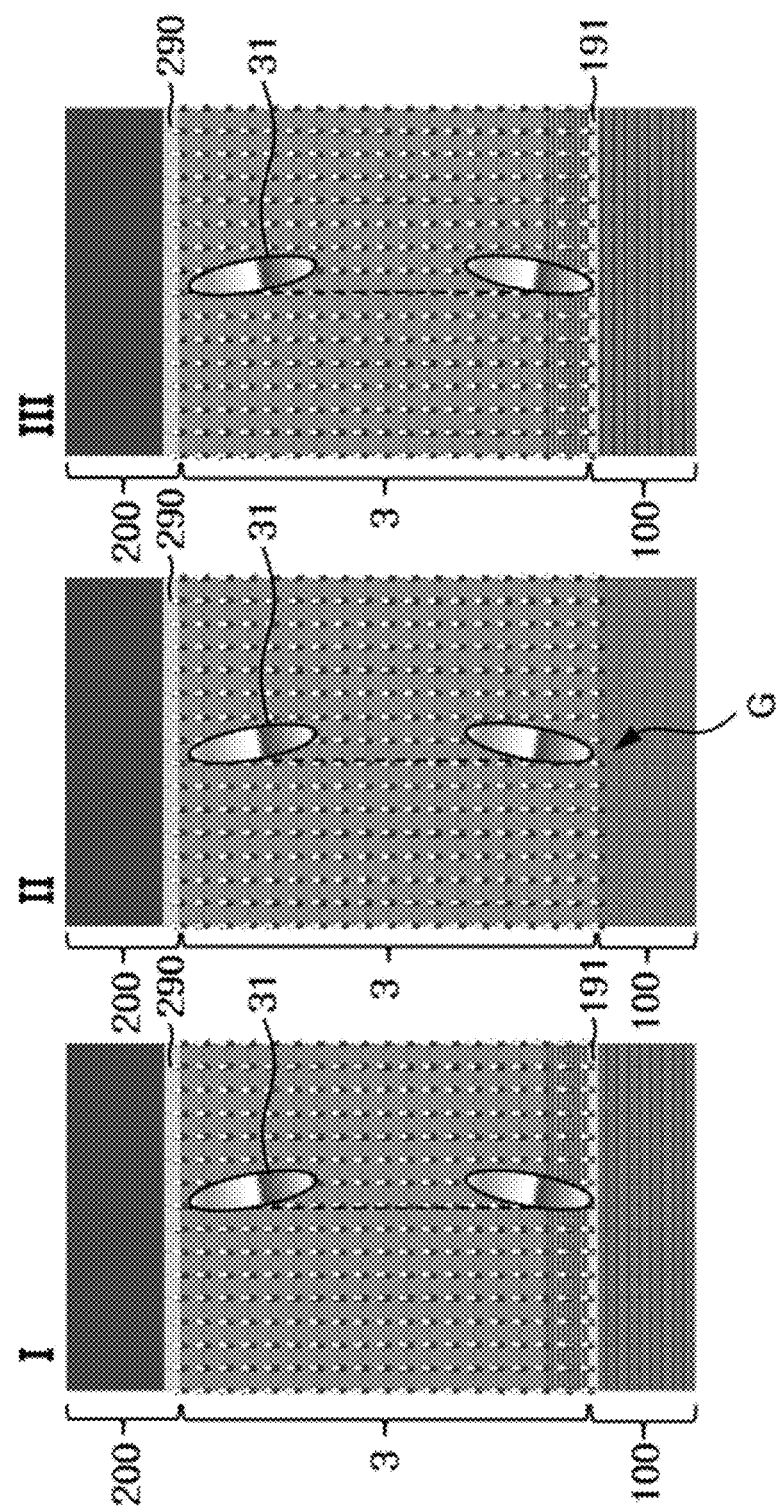

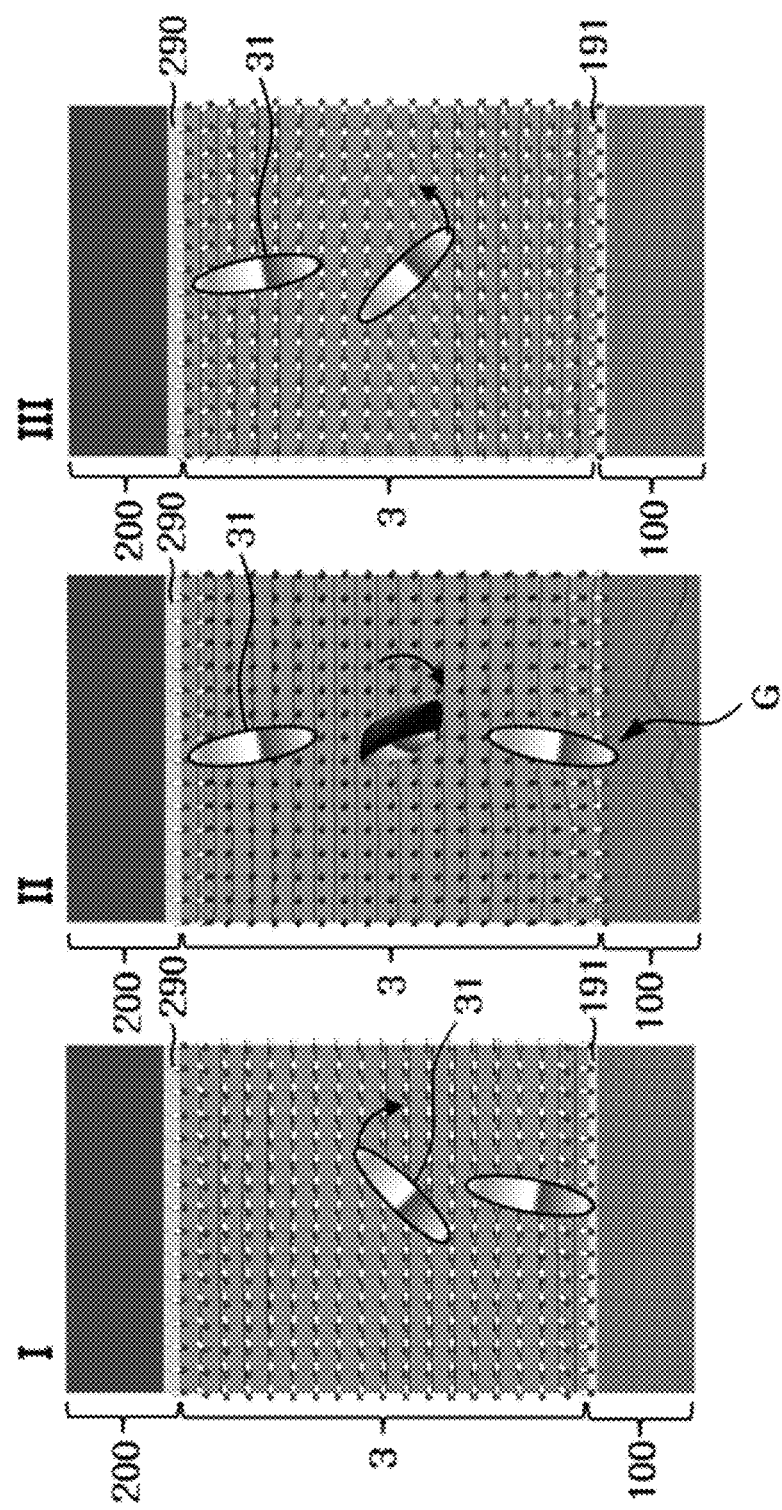

OPTICAL MODULATOR INCLUDING LIQUID CRYSTAL, DRIVING METHOD THEREOF, AND OPTICAL DEVICE USING THE SAME

CROSS-REFERENCE TO RELATED APPLICATION

This application claims priority to and the benefit of Korean Patent Application No. 10-2014-0110867, filed in the Korean Intellectual Property Office on Aug. 25, 2014, the entire content of which is incorporated herein by reference.

BACKGROUND

1. Field

The following description relates to an optical modulation device, a driving method thereof, and an optical device using the same. More particularly, the present invention relates to an optical modulation device using liquid crystal, a driving method thereof, and an optical device using the same.

2. Description of the Related Art

Recently, optical devices (e.g., display devices) using an optical modulation device for modulating an optical characteristic of the optical devices have been widely developed. For example, optical display devices for displaying three-dimensional (3D) images have been paid much attention, and they can include and/or use an optical modulation device to separate images and transmit the same at different times so that a viewer may recognize them as stereoscopic images. The optical modulation device is designed to be used in a stereoscopic image display device without using other viewing equipment, such as a lens and a prism, to change a path of light (e.g., images) displayed by a display device and transmit the same at a desired time.

Diffraction of light by phase modulation can be used to change a direction of incident light.

When polarized light passes through an optical modulation device, such as a phase delay unit, its polarized state is changed. For example, when circularly polarized light is input to a half-wave plate, a rotation direction of the circularly polarized light is changed to be opposite (e.g., 180° different) and the light is output. For example, when light circularly polarized to the left passes through the half-wave plate, light circularly polarized to the right is output. In this example, a phase of the circularly polarized output light is different depending on an optical axis of the half-wave plate, that is, an angle of a slow axis. For example, when an optical axis of the half-wave plate is rotated by in-plane $\varphi$, a phase of the output light is changed by $2\varphi$. Therefore, when the optical axis of the half-wave plate is rotated by 180 degrees ($\pi$ radian) in a spatially x-axis direction, the light can be output with phase modulation or phase change of 360 degrees ($2\pi$ radian) in the x-axis direction. When the optical modulation changes the phase of inputted light from 0 to $2\pi$ according to positions on the optical modulation device, a diffraction lattice or a prism for changing or redirecting the direction of the passed light can be realized.

Liquid crystal can be used to easily control the optical axis of the optical modulation device, such as the half-wave plate, according to the position on the optical modulation device. Regarding the optical modulation device realized as a phase delay unit including liquid crystal, different phase modulations can be performed by rotating a long axis of liquid crystal molecules that are arranged according to an electric field applied to a liquid crystal layer. The phase of light that passes through the optical modulation device and is output can be determined (e.g., adjusted or varied) by the direction of the arranged liquid crystal molecules, that is, an azimuthal angle.

To perform consecutive phase modulations by using the optical modulation device using liquid crystal and a prism, a diffraction lattice, or a lens, the liquid crystal molecules must be arranged so that a long axis of the liquid crystal molecules may be consecutively changed according to the position on the optical modulation device. In order for the output light to have a phase profile that changes or varies from 0 to $2\pi$ according to the position, the optical axis of the half-wave plate must change or vary from 0 to $\pi$. For this purpose, a substrate that is adjacent to the liquid crystal layer may require alignments in different directions such the process becomes complicated. When the alignment must be finely distinguished and processed, it is difficult to uniformly perform the alignment process, such as a rubbing process, which may cause display faults when used in the display device.

The above information disclosed in this Background section is only for enhancement of understanding of the background of the invention, and therefore, it may contain information that does not form the prior art that is already known in this country to a person of ordinary skill in the art.

SUMMARY

An aspect of an embodiment of the present invention provides an optical modulation device including liquid crystal for easily controlling an in-plane rotation angle of liquid crystal molecules and modulating an optical phase of outputted light.

An aspect of an embodiment of the present invention also simplifies a process for manufacturing an optical modulation device including liquid crystal and increases a diffraction efficiency of the optical modulation device.

An aspect of an embodiment of the present invention can also be manufactured to be a widely applicable optical modulation device including liquid crystal; for example, it can function as a lens, a diffraction lattice, or a prism so that it may be usable with various optical devices.

An exemplary embodiment of the present invention provides an optical modulation device or an optical device including the same including: a first plate and a second plate facing the first plate; and a liquid crystal layer between the first plate and the second plate and including a plurality of liquid crystal molecules, wherein the first plate includes a plurality of first electrodes and a first aligner, the second plate includes at least one second electrode and a second aligner, an alignment direction of the first aligner is substantially parallel to an alignment direction of the second aligner, and portions of the first plate, the second plate, and the liquid crystal layer between the first and second plates are individual units.

When no electric field is applied to the liquid crystal layer, a pre-tilt direction of the liquid crystal molecules adjacent to the first plate may be opposite about a line normal to a surface of the first plate to a pre-tilt direction of the liquid crystal molecules adjacent to the second plate.

When an electric field is applied to the liquid crystal layer, an intensity of the electric field in a region adjacent to the first electrode may be greater than an intensity of the electric field in a region adjacent to the second electrode in a first unit from among the units.

An intensity of the electric field in a region adjacent to the first plate may be less than an intensity of the electric field in a region adjacent to the second plate in a second unit from among the units and neighboring the first unit.

A respective one of the first electrodes may be in each of the first unit and the second unit respectively.

A voltage supplied to the first electrode in the first unit may be greater than a voltage supplied to the first electrode in the second unit.

One of the first electrodes may be in the first unit, and no first electrodes may be in the second unit.

The plurality of first electrodes includes at least four first electrodes, and at least two of the first electrodes may be in each of the first unit and the second unit.

A voltage supplied to the first electrodes in the first unit may be greater than a voltage supplied to the first electrodes in the second unit.

The second plate may further include a plurality of second electrodes.

Respective ones of the second electrodes may be aligned with respective ones of the first electrodes.

The second electrodes may be arranged along a direction along which the first electrodes are arranged.

The second electrodes may be arranged along a direction which is substantially perpendicular to a direction along which the first electrodes are arranged.

Regions in which ones of the first electrodes overlap ones of the second electrodes and regions in which ones of the first electrodes do not overlap ones of the second electrodes may be alternately arranged.

When an electric field is applied to the liquid crystal layer, the voltage supplied to the first electrodes may vary in a stepwise manner.

Another embodiment of the present invention provides a method for driving an optical modulation device, the optical modulation device including a first plate and a second plate facing the first plate, the first plate including a plurality of first electrodes and the second plate comprising at least one second electrode, and a liquid crystal layer between the first plate and the second plate, wherein portions of the first plate, the second plate, and the liquid crystal layer between the first and second plates are individual units, the method comprising: supplying a voltage to the first electrodes and to the at least one second electrode such that an intensity of an electric field in the liquid crystal layer in a region adjacent to the first plate and corresponding to one of the first electrodes in a first unit from among the units may be greater than an intensity of the electric field in the liquid crystal layer in a region adjacent to the second plate.

The supplying of the voltage to the first electrodes and to the at least one second electrode creates an intensity of the electric field in the liquid crystal layer in a region adjacent to the first plate that may be less than an intensity of the electric field in the liquid crystal layer in a region adjacent to the second plate and corresponding a second unit from among the units and neighboring the first unit.

The voltage supplied to the first electrode in the first unit may be greater than the voltage supplied to the first electrode in the second unit.

The voltage supplied to the first electrode may be varied in a stepwise manner.

According to an embodiments of the present invention, the optical phase of outputted light is modulated by easily controlling the in-plane rotation angle of the liquid crystal molecule in the optical modulation device including liquid crystal. Also, the process for manufacturing an optical modulation device including liquid crystal is simplified and a diffraction efficiency of the optical modulation device is increased. Further, the optical modulation device including liquid crystal is manufactured to be widely applicable, such that it can function as a lens, a diffraction lattice, or a prism such that it is usable with various kinds of optical devices.

BRIEF DESCRIPTION OF THE DRAWINGS

FIG. 4B shows a cross-sectional view of the optical modulation device shown in FIG. 4A with respect to the planes I, II, and III.

FIG. 5B shows a cross-sectional view of the optical modulation device shown in FIG. 5A with respect to the planes I, II, and III.

DETAILED DESCRIPTION

Figure 1:
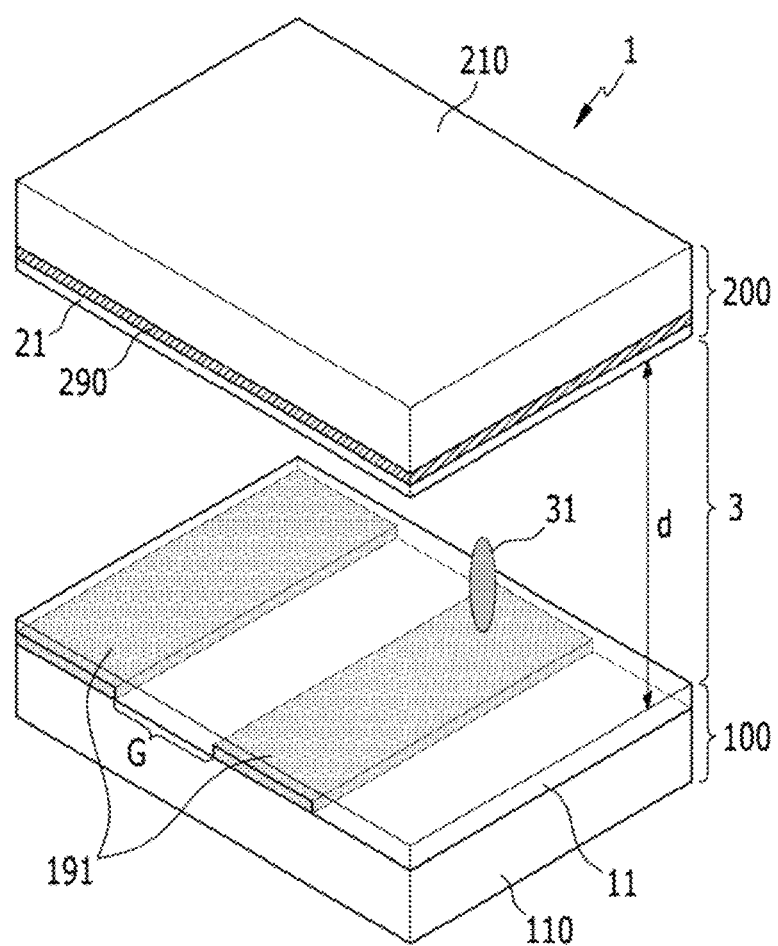
FIG. 1 shows a perspective view of an optical modulation device according to an exemplary embodiment of the present invention.

The present invention will be described more fully hereinafter with reference to the accompanying drawings in which exemplary embodiments of the invention are shown. As those skilled in the art would realize, the described embodiments may be modified in various different ways, all without departing from the spirit or scope of the present invention.

In the drawings, the thickness of layers, films, panels, regions, etc. may be exaggerated for clarity. Like reference numerals designate like elements throughout the specification. It will be understood that when an element, such as a layer, film, region, or substrate, is referred to as being "on" another element, it can be directly on the other element or intervening elements may also be present. When an element is referred to as being "directly on" another element, there are no intervening elements present.

Further, the use of "may" when describing embodiments of the present invention relates to "one or more embodiments of the present invention". Expression, such as "at least one of," when preceding a list of elements, modify the entire list of elements and do not modify the individual elements of the list. Also, the term "exemplary" is intended to refer to an example or illustration.

It will be understood that, although the terms first, second, third, etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly. As used herein, the terms "use," "using," and "used" may be considered synonymous with the terms "utilize," "utilizing," and "utilized," respectively.

The terminology used herein is for the purpose of describing particular example embodiments only and is not intended to be limiting of example embodiments. As used herein, the singular forms "a", "an", and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. Further, when a first element is described as being "coupled" or "connected" to a second element, the first element may be directly coupled or connected to the second element or the first element may be indirectly coupled or connected to the second element via one or more intervening elements. The same reference numerals designate the same elements.

An optical modulation device according to an exemplary embodiment of the present invention will now be described with reference to FIG. 1 to FIG. 3.

Figure 2:
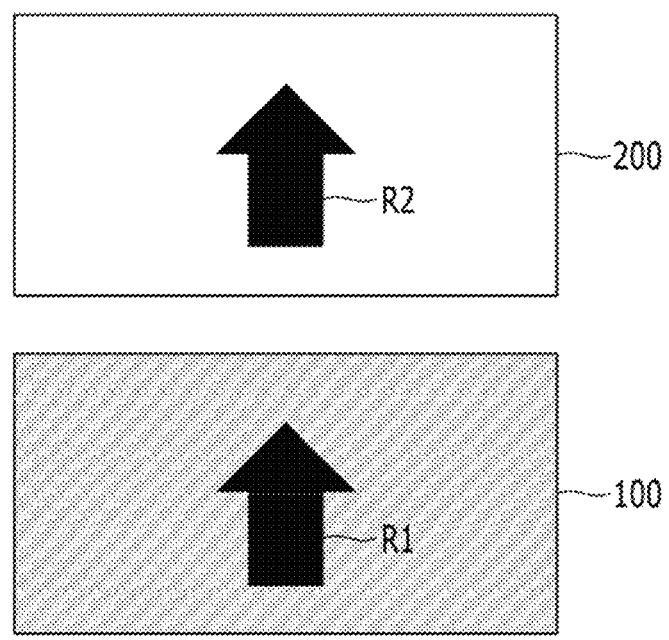
FIG. 2 shows a top plan view of an alignment direction on a first plate and a second plate included in an optical modulation device according to an exemplary embodiment of the present invention.
Figure 3:
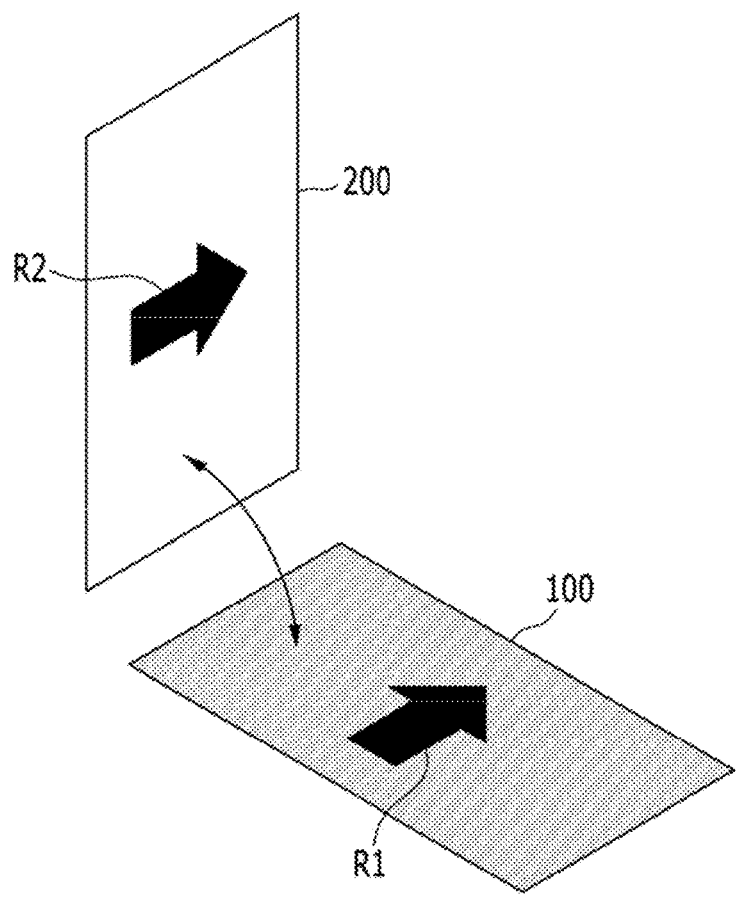
FIG. 3 shows a process for bonding the first plate and the second plate shown in FIG. 2.

FIG. 1 shows a perspective view of an optical modulation device according to an exemplary embodiment of the present invention, FIG. 2 shows a top plan view of an alignment direction on a first plate and a second plate included in an optical modulation device according to an exemplary embodiment of the present invention, and FIG. 3 shows a process for bonding the first plate and the second plate shown in FIG. 2.

Referring to FIG. 1, an optical modulation device 1 according to an exemplary embodiment of the present invention includes a first plate 100 and a second plate 200 facing each other and a liquid crystal layer 3 provided therebetween.

The first plate 100 includes a first substrate 110 made of glass or plastic. The first substrate 110 can be rigid, flexible, flat, and/or at least part of it may be bendable.

A plurality of first electrodes 191 are provided on the first substrate 110. The first electrodes 191 include a conductive material and can include a transparent conductive material (such as ITO or IZO) and/or a metal. One of the first electrodes 191 receives a voltage from a voltage supply unit, and another of the first electrodes 191 that is adjacent to or away from the one first electrode 191 receives a different voltage.

The first electrodes 191 are arranged along a direction (e.g., a predetermined direction), for example, an x-axis direction, and the first electrodes 191 can extend in a direction that crosses (e.g., is perpendicular to) the arranged direction, for example, a y-axis direction.

A width of a space (G) between neighboring ones of the first electrodes 191 may be changed or varied depending on design conditions of the optical modulation device. A ratio of the width of one of the first electrodes 191 and a width of the adjacent space (G) can be about N:1 (where N is a real number that is greater than 1).

The second plate 200 includes a second substrate 210 made of glass or plastic. The second substrate 210 can be rigid, flexible, flat, and/or at least part of it may be bendable.

A second electrode 290 is provided on the second substrate 210. The second electrode 290 includes a conductive material, and it can include a transparent conductive material (such as ITO or IZO) and/or a metal. The second electrode 290 receives a voltage from a voltage supply unit. The second electrode 290 can be formed as a whole body (e.g., a single body or a common electrode) on the second substrate 210 or can be patterned to include a plurality of separated portions (e.g., may be a plurality of second electrodes).

The liquid crystal layer 3 includes a plurality of liquid crystal molecules 31. The liquid crystal molecules 31 have negative dielectric anisotropy and are arranged in a transverse direction with respect to a direction of an electric field applied to the liquid crystal layer 3. The liquid crystal molecules 31 are aligned substantially normal or perpendicular with respect to the second plate 200 and the first plate 100 (e.g., substantially perpendicular to surfaces of the second plate 200 and the first plate 100) when no electric field is applied to the liquid crystal layer 3, and the liquid crystal molecules 31 can be pre-tilted in a direction (e.g., a specific direction) with respect to the second plate 200 and the first plate 100. The liquid crystal molecules 31 can be nematic liquid crystal molecules.

A height (d) of a cell gap of the liquid crystal layer 3 can substantially satisfy [Equation 1] for light having a wavelength (λ). Accordingly, the optical modulation device 1 according to an exemplary embodiment of the present invention can function as a half-wave plate and can be used as a diffraction lattice or a lens.

$$\frac{\lambda}{2} \times 1.3 \geq \Delta nd \geq \frac{\lambda}{2}$$ Equation 1

In [Equation 1], Δnd is a phase delay value of light passing through the liquid crystal layer 3.

A first aligner 11 is provided on (or inside) the first plate 100, and a second aligner 21 is provided on (or inside) the second plate 200. The first aligner 11 and the second aligner 21 can be vertical alignment layers, and the first aligner 11 and the second aligner 21 can have or provide an alignment force according to various methods, such as a rubbing process or an optical alignment method. The first aligner 11 and the second aligner 21 can determine a pre-tilt direction of the liquid crystal molecules 31 that are near (e.g., adjacent to) the first plate 100 and the second plate 200, respectively. When the rubbing process is used, the vertical alignment layer can be an organic vertical alignment layer. When the optical alignment process is used, an alignment material including a photosensitive polymer material is coated on the first plate 100 and the second plate 200, and rays, such as ultraviolet rays, are irradiated thereto to form a photopolymerization material.

Referring to FIG. 2, alignment directions R1 and R2 of the first and second aligners 11 and 21 respectively provided inside the first plate 100 and the second plate 200 are parallel or substantially parallel with each other. Also, the alignment directions R1 and R2 of the first and second aligners 11 and 21 are constant.

Due to a misalignment margin between the first plate 100 and the second plate 200, a difference between an azimuthal angle of the first aligner 11 of the first plate 100 and an azimuthal angle of the second aligner 21 of the second plate 200 can be about ±5 degrees but is not limited thereto.

Referring to FIG. 3, the first plate 100 and the second plate 200, on which the first and second aligners 11 and 21 are formed, are arranged such that the first and second aligners 11 and 21 are substantially parallel to each other and are bonded to each other to form the optical modulation device 1 according to an exemplary embodiment of the present invention.

The first plate 100 and the second plate 200 are not restricted to being above and below each other as illustrated in the drawings but can be arranged in orientations differing from that shown in the drawings.

According to the above-described exemplary embodiment of the present invention, the alignment directions of the first and second aligners 11 and 21 formed on the first plate 100 and the second plate 200, respectively, of the optical modulation device 1 including liquid crystal are parallel with each other, and the alignment directions of the first and second aligners 11 and 21 are constant such that the process for aligning the optical modulation device is simplified and the alignment process is simplified. Therefore, faults in the optical modulation device caused by an alignment fault or faults in the optical device including the same may be reduced. Further, larger (e.g., wider) optical modulation devices can be easily manufactured.

A method for driving an optical modulation device according to an exemplary embodiment of the present invention will now be described with reference to FIG. 1 to FIG. 3 and FIG. 4A to FIG. 11.

Figure 4A:
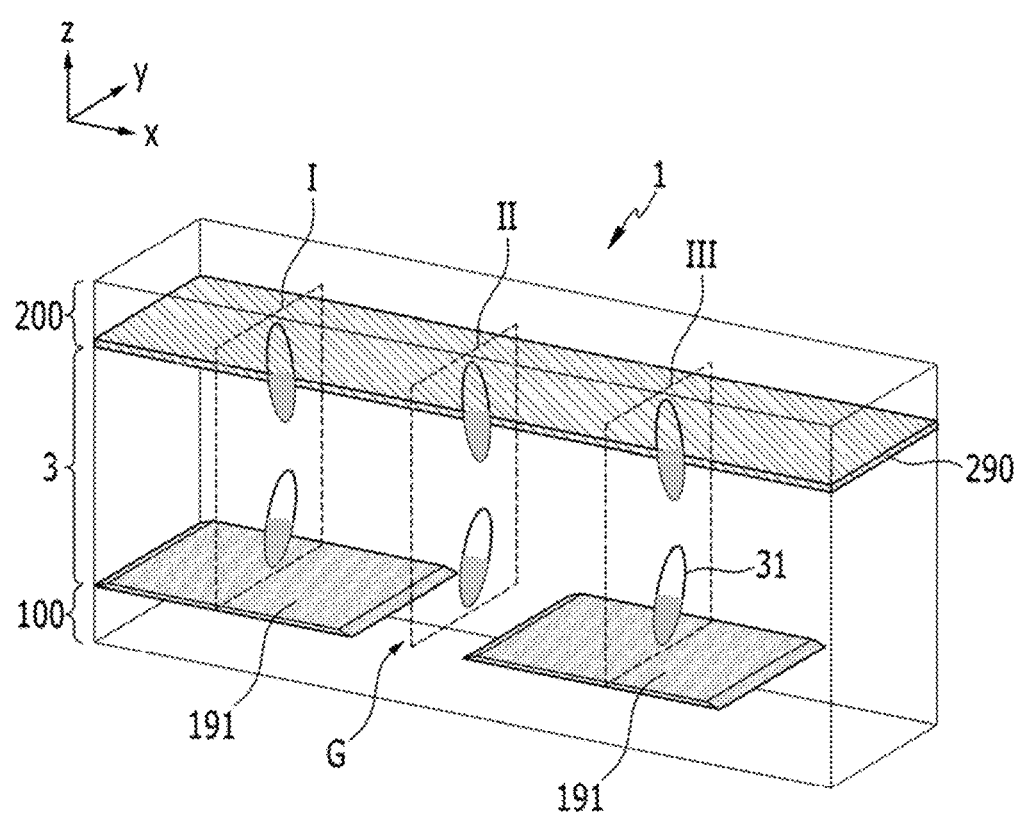
FIG. 4A shows a perspective view of an arrangement of liquid crystal molecules when no voltage difference is imparted to a first plate and a second plate of an optical modulation device according to an exemplary embodiment of the present invention.

Referring to FIG. 4A and FIG. 4B, when a voltage difference is not imparted between the first electrode 191 of the first plate 100 and the second electrode 290 of the second plate 200, such that an electric field is not applied to the liquid crystal layer 3, the liquid crystal molecules 31 are arranged according to the initial pre-tilt. FIG. 4B shows a cross-sectional view with respect to the plane I corresponding to one of the plurality of first electrodes 191 of the optical modulation device 1 shown in FIG. 4A, a cross-sectional view with respect to the plane II corresponding to the space (G) between two neighboring ones of the first electrodes 191, and a cross-sectional view with respect to the plane III corresponding to another one of the first electrodes 191 that is adjacent to the one the first electrode 191, and with reference to FIG. 4B, the liquid crystal molecules 31 can be arranged substantially constant at each of the planes I, II, and III.

In FIG. 4B, some of the liquid crystal molecules 31 are shown, for ease of illustration, to have permeated into a region of the first plate 100 or the second plate 200, but, in actuality, the liquid crystal molecules 31 do not permeate into the region of the first plate 100 or the second plate 200, which is illustrated in the subsequent drawings.

The liquid crystal molecules 31 that are adjacent to the first plate 100 and the second plate 200 are initially aligned parallel to alignment direction of the first and second aligners 11 and 21, respectively, such that a pre-tilt direction of the liquid crystal molecules 31 that are adjacent to the first plate 100 is not parallel with a pre-tilt direction of the liquid crystal molecules 31 that are adjacent to the second plate 200, but the pre-tilt directions are opposite to each other. For example, the liquid crystal molecules 31 that are adjacent to the first plate 100 and the liquid crystal molecules 31 that are adjacent to the second plate 200 can be inclined in directions in which they may be symmetrical to each other with respect to a horizontal center line that extends horizontally along a center of the liquid crystal layer 3 in the cross-sectional view. For example, when the liquid crystal molecules 31 that are adjacent to the first plate 100 are inclined to the right, the liquid crystal molecules 31 that are adjacent to the second plate 200 are inclined to the left.

Figure 5A:
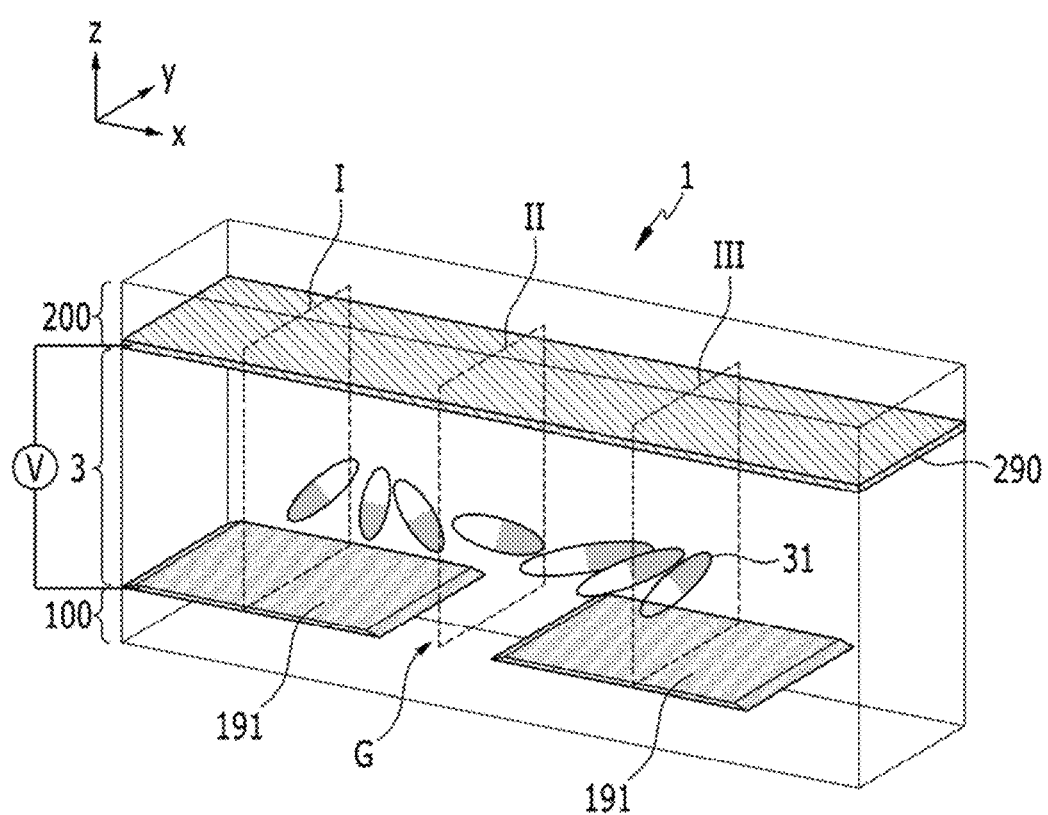
FIG. 5A shows a perspective view of an arrangement of liquid crystal molecules when a voltage difference is imparted to a first plate and a second plate of an optical modulation device according to an exemplary embodiment of the present invention.

Referring to FIG. 5A and FIG. 5B, when a voltage difference that is greater than a threshold voltage is generated (e.g., imparted) between the first electrode 191 of the first plate 100 and the second electrode 290 of the second plate 200 such that an electric field is applied to the liquid crystal layer 3, the liquid crystal molecules 31 having negative dielectric anisotropy tend to be inclined in a direction that is perpendicular or substantially perpendicular to the direction of the electric field. Therefore, as shown in FIG. 5A and FIG. 5B, most of the liquid crystal molecules 31 are inclined substantially parallel to a surface of the first plate 100 or the second plate 200 to have an in-plane arrangement, and a long axis of the liquid crystal molecules 31 is rotated in an in-plane direction (e.g., an in-plane manner) to be arranged. The in-plane arrangement signifies that the long axis of the liquid crystal molecules 31 is arranged to be parallel or substantially parallel to the surface of the first plate 100 or the second plate 200.

In this embodiment, an in-plane rotation angle of the liquid crystal molecules 31, that is, an azimuthal angle, is variable according to the voltage applied to the corresponding first electrode 191 and the second electrode 290, and as a result, it can be changed or varied to be spiral depending on a position along the x-axis direction, which will now be described with reference to FIG. 4A to FIG. 5B and FIG. 6 to FIG. 10.

Figure 6:
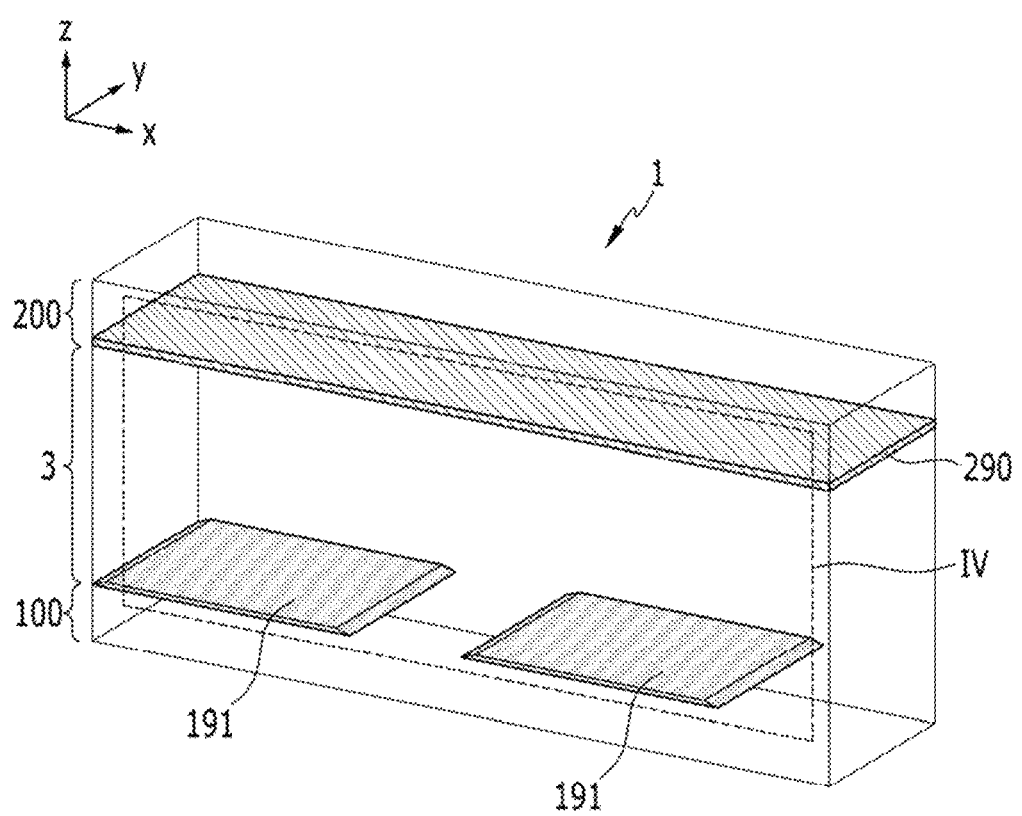
FIG. 6 shows a perspective view of an optical modulation device according to an exemplary embodiment of the present invention.

FIG. 6 shows a perspective view of an optical modulation device 1 according to an exemplary embodiment of the present invention which has a same or substantially the same structure as that of the above-described exemplary embodiment.

Figure 7:
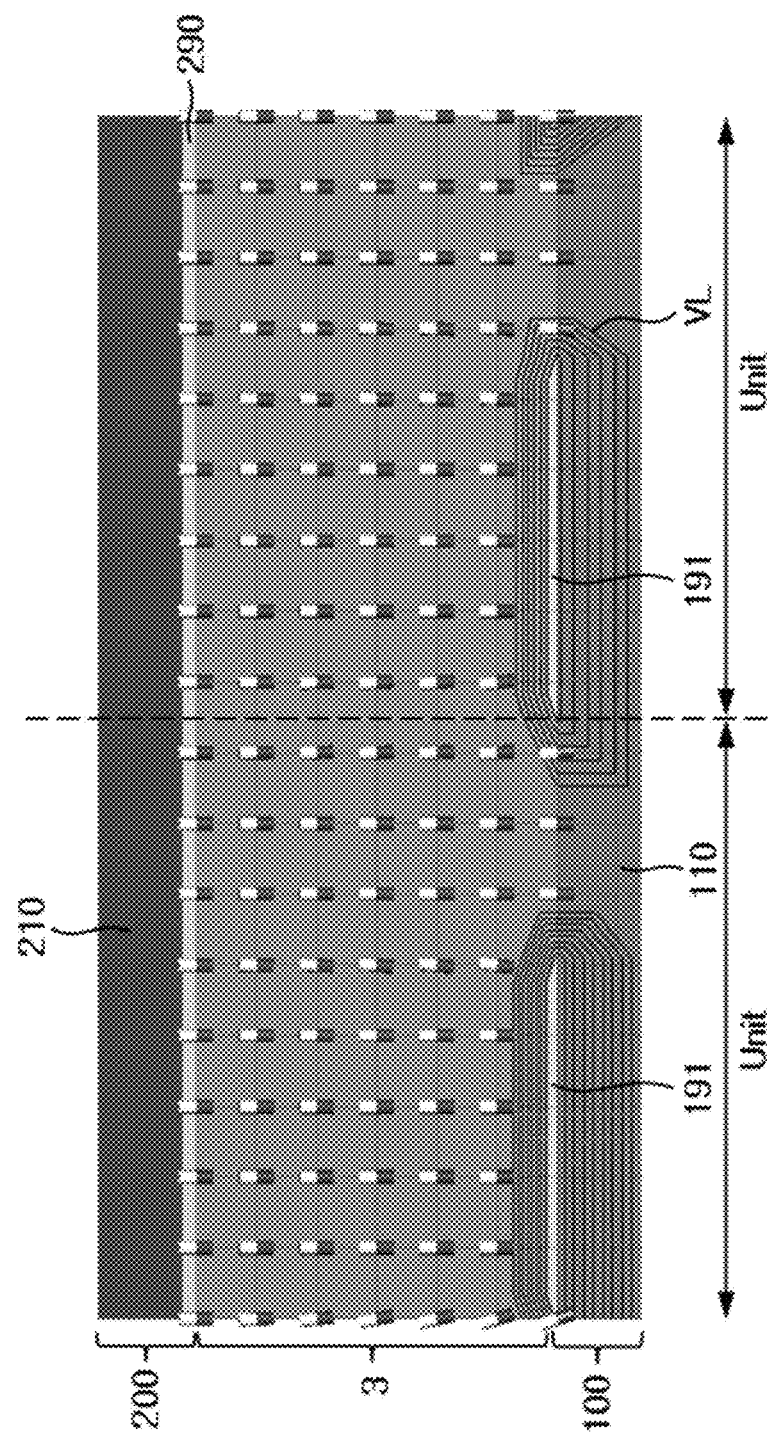
FIG. 7 shows a cross-sectional view of an arrangement of liquid crystal molecules when no voltage difference is imparted to a first plate and a second plate of the optical modulation device shown in FIG. 6 with respect to the plane IV of FIG. 6.

FIG. 7 shows a cross-sectional view of an arrangement of liquid crystal molecules 31 with respect to the plane IV of FIG. 6 when no a voltage difference is provided between a first electrode 191 of a first plate 100 and a second electrode 290 of a second plate 200 of the optical modulation device 1 shown in FIG. 6. The liquid crystal molecules 31 are initially aligned in a direction that is substantially normal or perpendicular to a surface (e.g., a flat surface) of the first plate 100 and the second plate 200, and as previously described, the first and second aligners 11 and 21 can configure a pre-tilt of the liquid crystal molecules 31 according to the alignment directions R1 and R2 of the first plate 100 and the second plate 200. An equipotential line (VL) is shown around each of the first electrodes 191.

Figure 8:
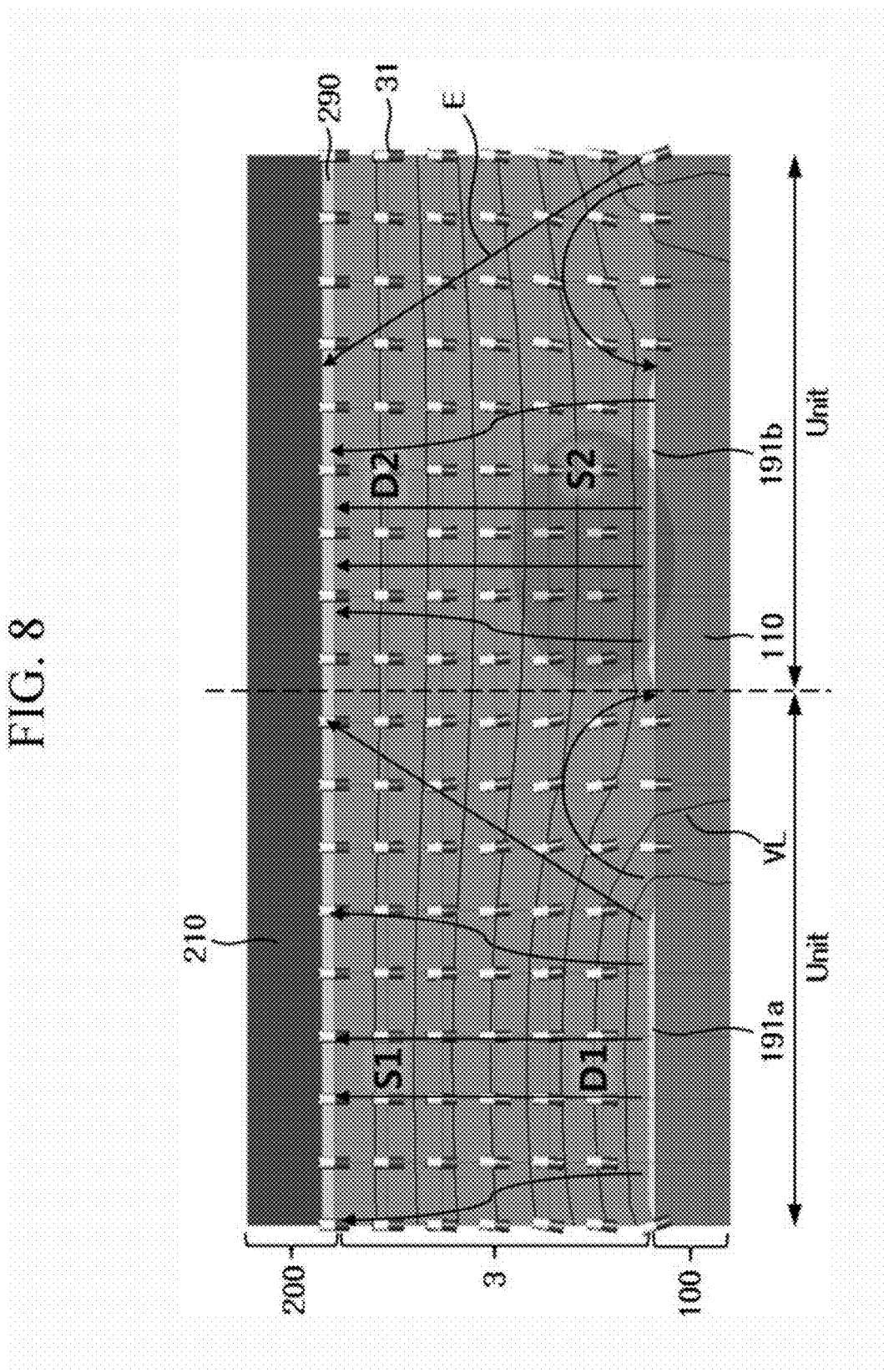
FIG. 8 shows a cross-sectional view of an arrangement of the liquid crystal molecules after a voltage difference is imparted to the first plate and the second plate of the optical modulation device shown in FIG. 6 with respect to the plane IV of FIG. 6.

FIG. 8 shows a cross-sectional view of the arrangement of the liquid crystal molecules 31 with respect to the plane IV of FIG. 6 after a voltage difference is provided between the first electrode 191 of the first plate 100 and the second electrode 290 of the second plate 200 of the optical modulation device 1 shown in FIG. 6. An electric field (E) is generated between the first electrode 191 of the first plate 100 and the second electrode 290 of the second plate 200, and a corresponding equipotential line (VL) is displayed. In this embodiment, the first electrode 191 has an edge side so, as shown in FIG. 8, a fringe field (e.g., a fringe electric field) can be formed between the edge side of the first electrode 191 and the second electrode 290.

The optical modulation device 1 includes a plurality of units each of which includes one of the first electrodes 191.

First electrodes 191a and 191b are provided in two neighboring units. The voltage applied to the first electrodes 191a and 191b and the second electrode 290 can be set to create (or indicate) an intensity distribution of the electric field (E) as shown in FIG. 8.

For example, when a voltage is initially applied to the first electrodes 191a and 191b and the second electrode 290, an intensity of the electric field in a region D1 of the unit including the first electrode 191a that is adjacent to the first plate 100 is stronger than an intensity of the electric field in a region S1 that is adjacent to the second plate 200 in the liquid crystal layer 3 of the unit including the first electrode 191a, and an intensity of the electric field in a region S2 that is adjacent to the first plate 100 of the unit including the first electrode 191b that is adjacent to the first electrode 191a is weaker than an intensity of the electric field in a region D2 that is adjacent to the second plate 200 in the liquid crystal layer 3 of the unit including the first electrode 191b that is adjacent to the first electrode 191a.

The respective voltages applied to the first electrodes 191a and 191b of the two neighboring units may be different. As shown in FIG. 8, the intensity of the electric field of the region S2 that is adjacent to the first electrode 191b may be weaker than the intensity of the electric field of the region D1 that is adjacent to the first electrode 191a. To create this difference, a second voltage applied to the first electrode 191a that is adjacent to the first electrode 191b may be greater than a first voltage applied to the first electrode 191b.

A third voltage applied to the second electrode 290 is different than the first voltage and the second voltage applied to the first electrodes 191b and 191a. For example, the third voltage applied to the second electrode 290 can be less than the first voltage and the second voltage applied to the first electrodes 191b and 191a.

For example, 6 volts can be applied to the first electrode 191a, 5 volts can be applied to the first electrode 191b, and 0 volts can be applied to the second electrode 290 to form the electric field (E) distribution shown in FIG. 8.

Figure 9:
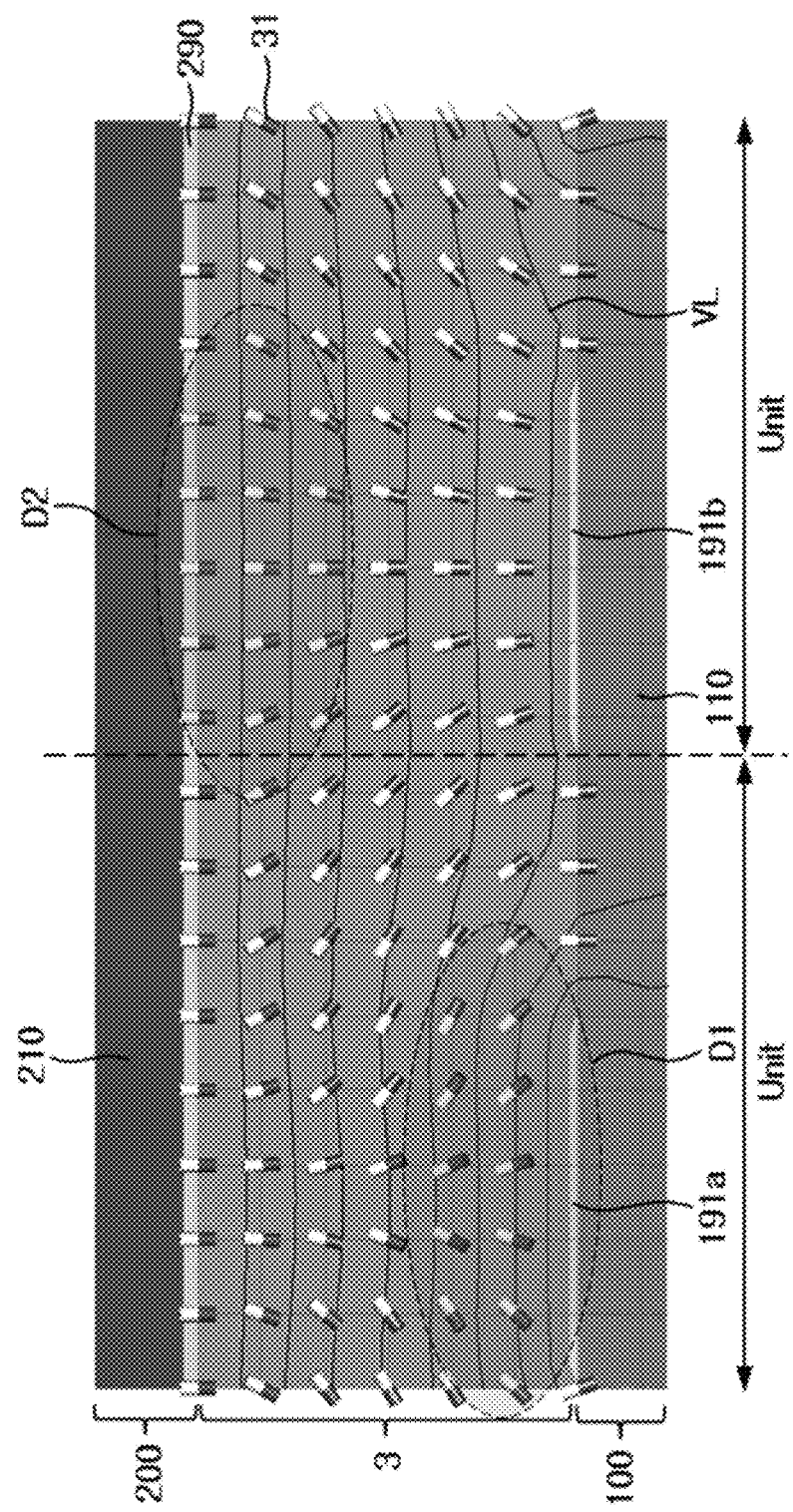
FIG. 9 shows a cross-sectional view of the arrangement of the liquid crystal molecules before they are stabilized after the voltage difference is imparted to the first plate and the second plate of the optical modulation device shown in FIG. 6 with respect to the plane IV of FIG. 6.

FIG. 9 shows a cross-sectional view of the arrangement of the liquid crystal molecules 31 with respect to the plane IV of FIG. 6 reacting to the electric field (E) after an initial voltage difference is imparted between the first electrodes 191 of the first plate 100 (e.g., the first electrodes 191a and 191b) and the second electrode 290 of the second plate 200 of the optical modulation device 1 shown in FIG. 6. As described above, the electric field in the region D1 that is adjacent to the first electrode 191a is the strongest in the liquid crystal layer 3 corresponding to the first electrode 191a such that a direction in which the liquid crystal molecules 31 of the region D1 are inclined determines an in-plane arrangement direction of the liquid crystal molecules 31 corresponding to the first electrode 191a. Therefore, the liquid crystal molecules 31 are inclined in an initial pre-tilt direction of the liquid crystal molecules 31 that are adjacent to the first plate 100 to form an in-plane arrangement in the region that corresponds to the first electrode 191a.

The electric field in the region D2 that is adjacent to the second electrode 290 facing the first electrode 191b is the strongest in the liquid crystal layer 3 corresponding to the first electrode 191b such that the direction in which the liquid crystal molecules 31 of the region D2 are inclined determines the in-plane arrangement direction of the liquid crystal molecules 31. Therefore, the liquid crystal molecules 31 that are adjacent to the second plate 200 are inclined in an initial pre-tilt direction of the liquid crystal molecules 31 to form an in-plane arrangement in the region that corresponds to the first electrode 191b. The initial pre-tilt direction of the liquid crystal molecules 31 that are adjacent to the first plate 100 is opposite to the initial pre-tilt direction of the liquid crystal molecules 31 that are adjacent to the second plate 200 such that the direction in which the liquid crystal molecules 31 corresponding to the first electrode 191b are inclined is opposite to the direction in which the liquid crystal molecules 31 corresponding to the first electrode 191a are inclined.

Figure 10:
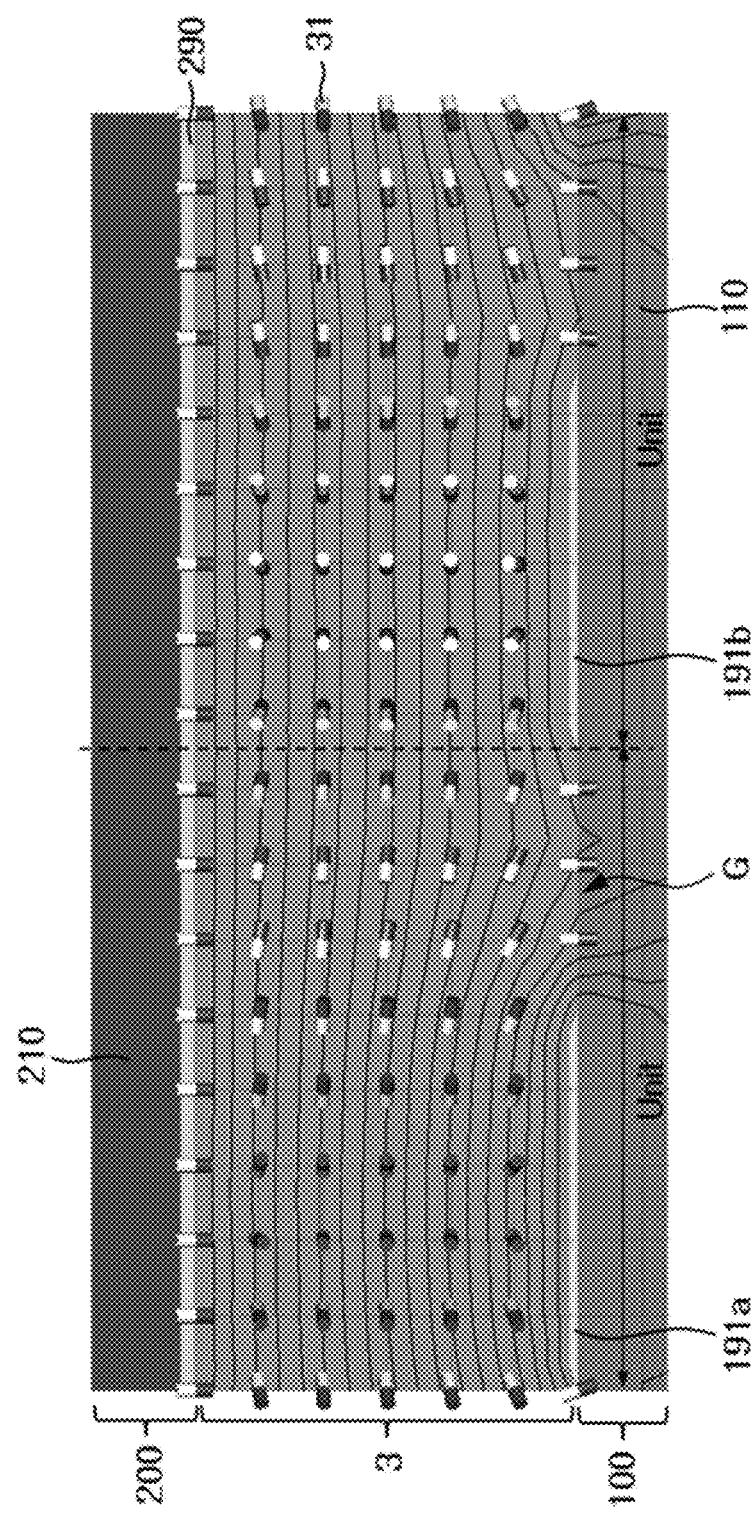
FIG. 10 shows a cross-sectional view of the arrangement of the liquid crystal molecules that are stabilized after the voltage difference is imparted to the first plate and the second plate of the optical modulation device shown in FIG. 6 with respect to the plane IV of FIG. 6.

FIG. 10 shows a cross-sectional view of the arrangement of the liquid crystal molecules 31 of the optical modulation device 1 shown in FIG. 6 with respect to the plane IV of FIG. 6 that are stabilized after the initial voltage difference is provided between the first electrode 191 of the first plate 100 and the second electrode 290 of the second plate 200. Referring to FIG. 10, the in-plane arrangement direction of the liquid crystal molecules 31 corresponding to the first electrode 191b is opposite to the in-plane arrangement direction of the liquid crystal molecules 31 corresponding to the first electrode 191a, and the liquid crystal molecules 31 corresponding to the space (G) between the adjacent first electrodes 191a and 191b are consecutively rotated in the x-axis direction to have a spiral arrangement.

The liquid crystal layer 3 of the optical modulation device 1 can provide a phase delay to the incident light in the x-axis direction.

Figure 11:
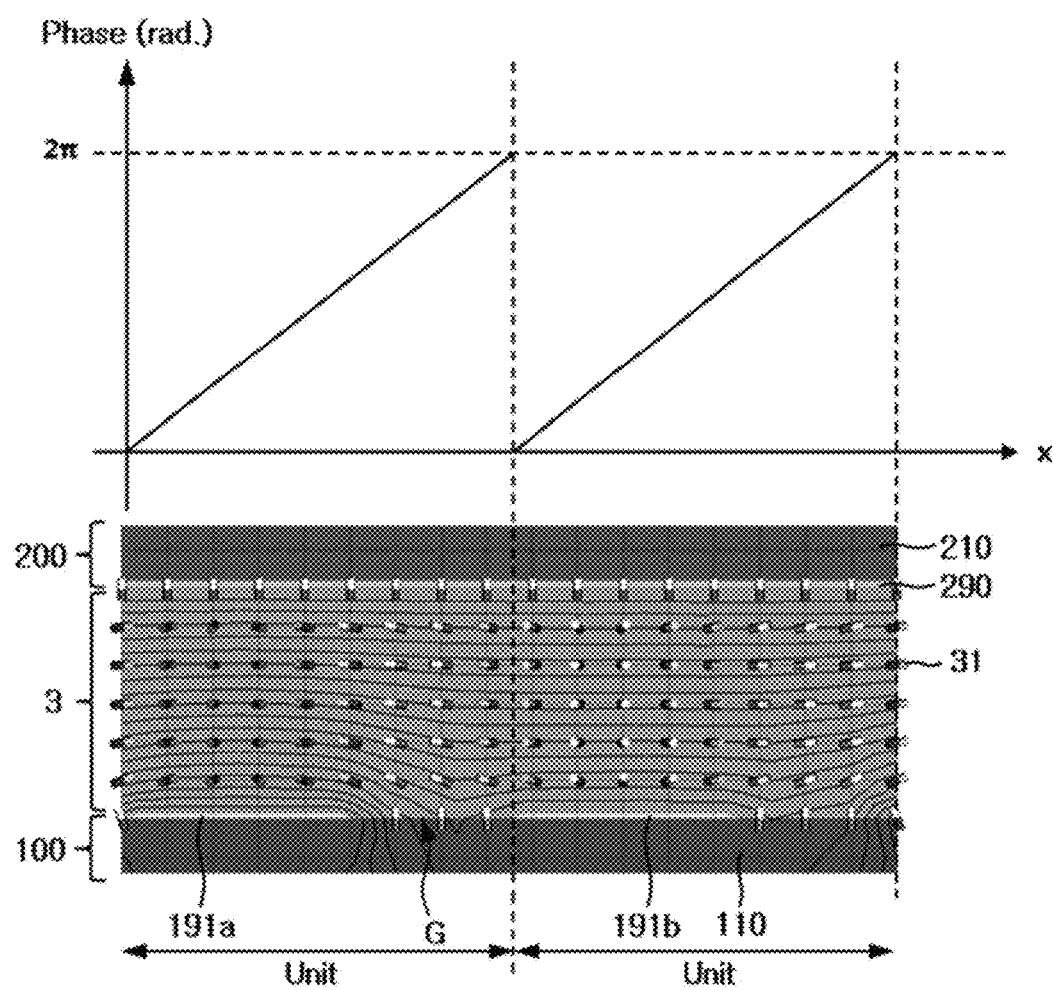
FIG. 11 shows a graph indicating a phase change of light having passed through the optical modulation device according to a position along the optical modulation device shown in FIG. 10.

Referring to FIG. 11, a region that is arranged when the liquid crystal molecules 31 are rotated by 180 degrees along the x-axis direction can be defined to be a single unit. In the present exemplary embodiment, one unit includes a space (G) between the first electrode 191a and the first electrode 191b that are adjacent to each other. When the optical modulation device 1 satisfies [Equation 1] and is realized as a half-wave plate, a rotation direction of the circularly polarized light that is input is changed in a reverse direction. FIG. 11 shows a change of phase according to a position along the x-axis direction of the optical modulation device when the light that is circularly polarized to the left is input to the optical modulation device 1. The light that is circularly polarized to the left, having passed through the optical modulation device 1, is changed into light that is circularly polarized to the right and is then output, and because a phase delay value of the liquid crystal layer 3 is different (or varies) along the x-axis direction, the phase of the light that is circularly polarized and output is continuously changed or varied along the x-axis direction.

In general, when the optical axis of the half-wave plate is rotated by in-plane φ, the phase of the output light is changed by 2φ so, as shown in FIG. 11, the phase of the light that is output by a single unit of which the azimuthal angle of the long axis of the liquid crystal molecules 31 changes or varies by 180 degrees is changed from 0 to 2π (radian) along the x-axis direction. This change of phase can be repeated for each unit, and a diffraction lattice, a prism, or a lens for changing the direction of light can be realized by using the optical modulation device 1.

Figure 13:
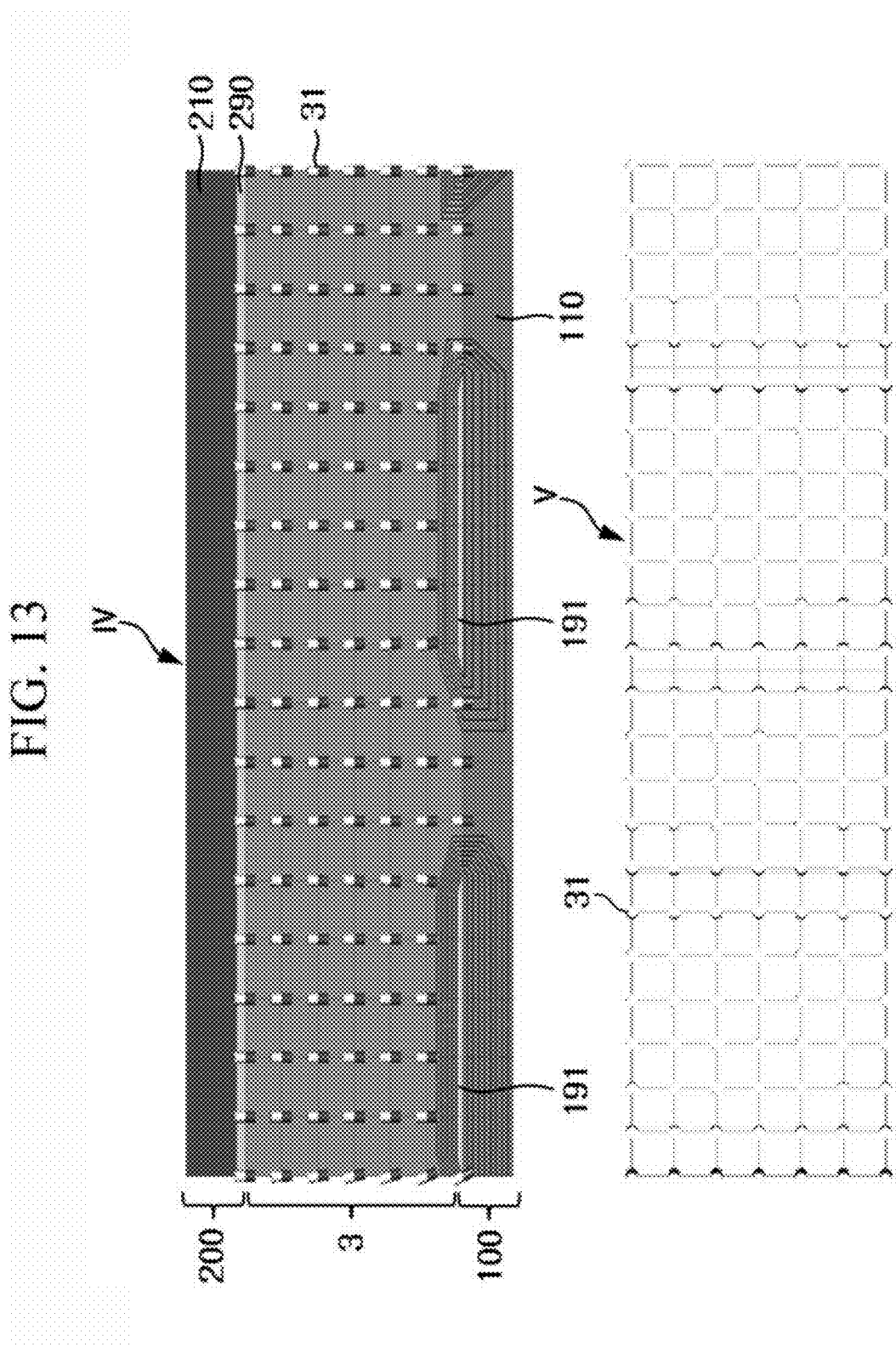
FIG. 13 shows a cross-sectional view with respect to the plane IV of FIG. 6 and a cross-sectional view with respect to the plane V of FIG. 12 and shows an arrangement of liquid crystal molecules when no voltage difference is imparted to a first plate and a second plate of the optical modulation device shown in FIG. 12.
Figure 14:
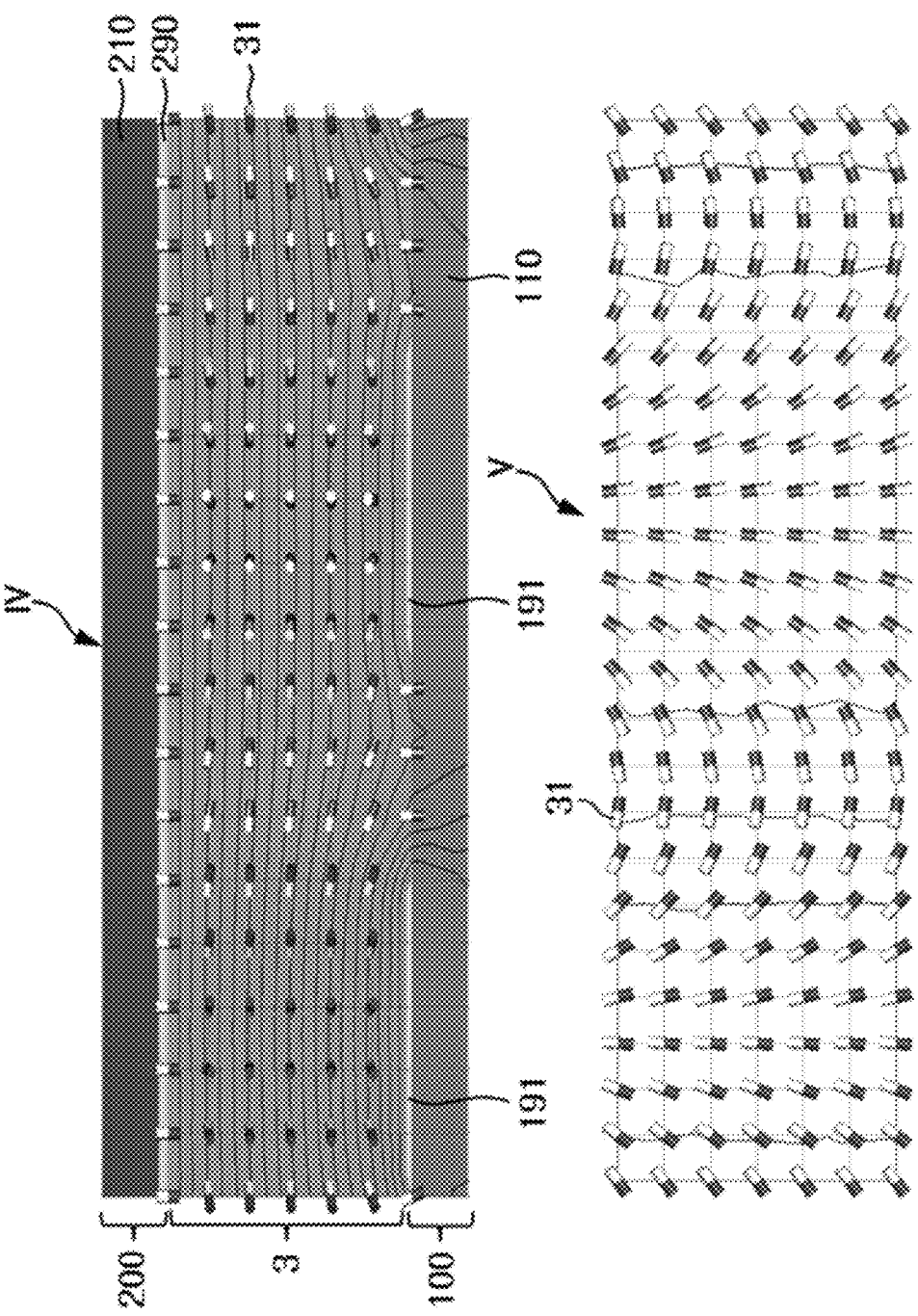
FIG. 14 shows a cross-sectional view with respect to the plane IV of FIG. 6 and a cross-sectional view with respect to the plane V of FIG. 12 and shows an arrangement of the liquid crystal molecules that are stabilized after the voltage difference is imparted to the first plate and the second plate of the optical modulation device shown in FIG. 12.

FIG. 13 to FIG. 14 show arrangements of liquid crystal molecules 31 when no voltage difference is imparted between a first electrode 191 and a second electrode 290 of an optical modulation device 1 and that arrangement of the liquid crystal molecules 31 that are stabilized after the voltage difference is imparted therebetween, respectively.

Figure 12:
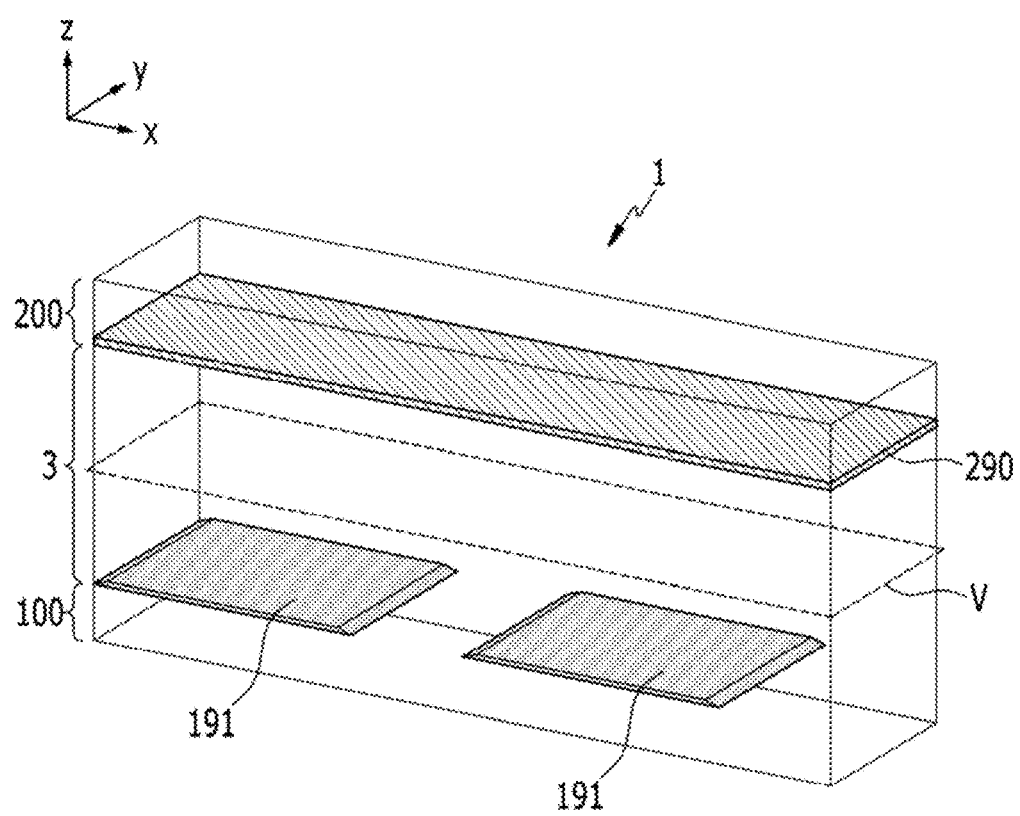
FIG. 12 shows a perspective view of an optical modulation device according to an exemplary embodiment of the present invention.

FIG. 12 shows an optical modulation device 1 including liquid crystal according to an exemplary embodiment of the present invention which has the same or substantially the same configuration as the above-described exemplary embodiment.

FIG. 13 shows a cross-sectional view of an arrangement of the liquid crystal molecules 31 when no voltage difference is provided between the first electrode 191 of the first plate 100 and the second electrode 290 of the second plate 200 of the optical modulation device 1 shown in FIG. 12, which is substantially the same as that described with reference to FIG. 7. FIG. 13 shows a cross-sectional view with respect to the plane V of FIG. 12. The liquid crystal molecules 31 are initially aligned in a direction that is substantially perpendicular to the surfaces of the first plate 100 and the second plate 200, and as described above, the first and second aligners 11 and 12 can impart a pre-tilt to the liquid crystal molecules 31 according to the alignment directions R1 and R2 of the first plate 100 and the second plate 200.

FIG. 14 shows a cross-sectional view of the arrangement of the liquid crystal molecules 31 that are stabilized after a voltage difference is imparted between the first electrode 191 of the first plate 100 and the second electrode 290 of the second plate 200 of the optical modulation device 1 shown in FIG. 12, which is substantially the same as that described with reference to FIG. 10. FIG. 14 shows a cross-sectional view with respect to the plane V of FIG. 12. The liquid crystal molecules 31 are rotated and arranged in an in-plane manner for each of the first electrodes 191, and the azimuthal angle of the long axis of the liquid crystal molecules 31 changes or varies from about 0 to 180 degrees in the region corresponding to a pitch of the first electrodes 191.

Without applying a complicated alignment process to the first plate 100 and the second plate 200, the liquid crystal molecules 31 that are spirally arranged in an in-plane manner can be easily arranged by controlling the voltages applied to the first electrodes 191 and the second electrode 290. Also, the voltage difference is not applied between the first plate 100 and the second plate 200 (i.e., which means an off state), so power consumption of the optical modulation device 1 can be reduced.

An optical modulation device including liquid crystal according to an exemplary embodiment of the present invention will now be described with reference to FIG. 15 to FIG. 17. The constituent elements that are the same or substantially the same as those described with reference to the above exemplary embodiment will have the same reference numerals and will not be described again.

Figure 15:
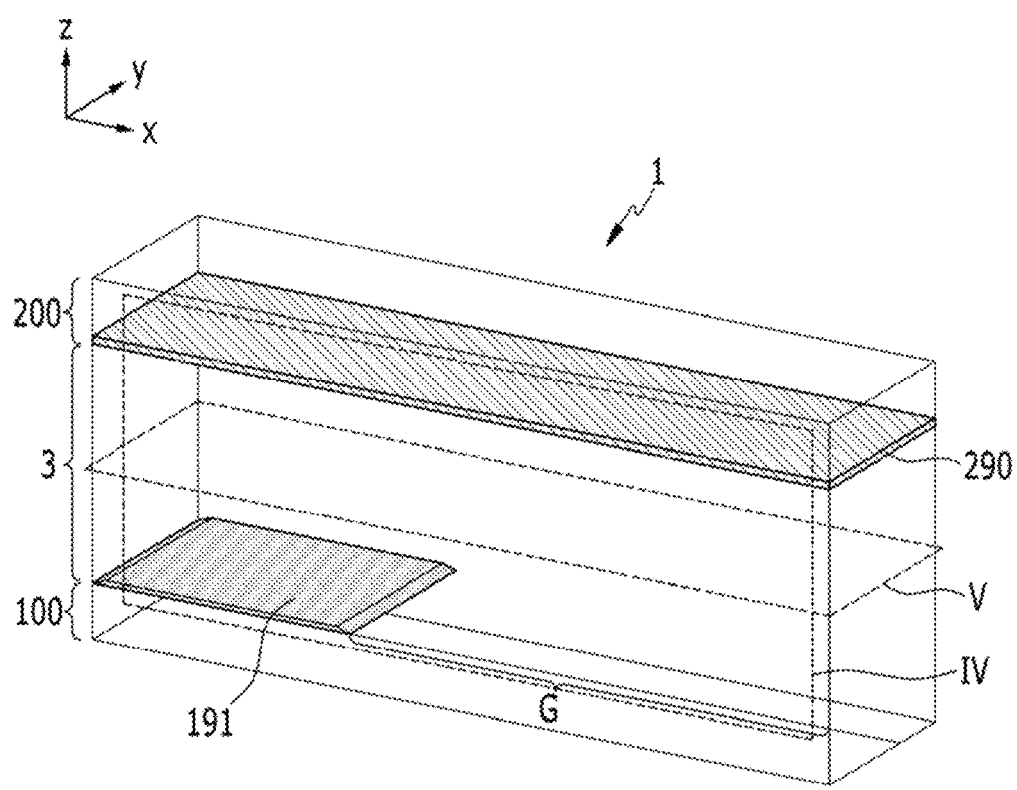
FIG. 15 shows a perspective view of an optical modulation device according to an exemplary embodiment of the present invention.
Figure 16:
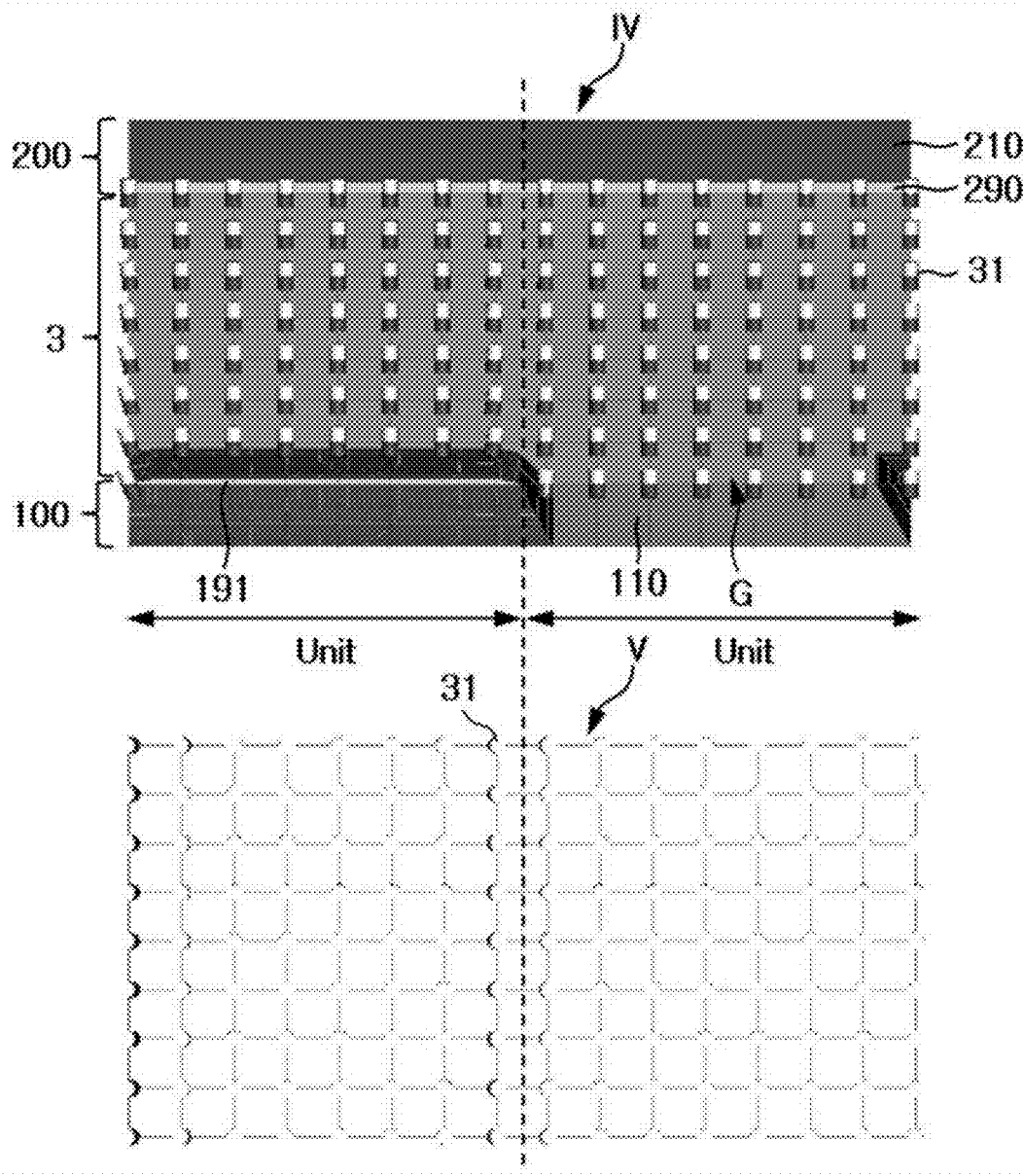
FIG. 16 shows a cross-sectional view with respect to the plane IV of FIG. 15 and a cross-sectional view with respect to the plane V of FIG. 15 and shows an arrangement of liquid crystal molecules before a voltage difference is imparted to a first plate and a second plate of the optical modulation device shown in FIG. 15.
Figure 17:
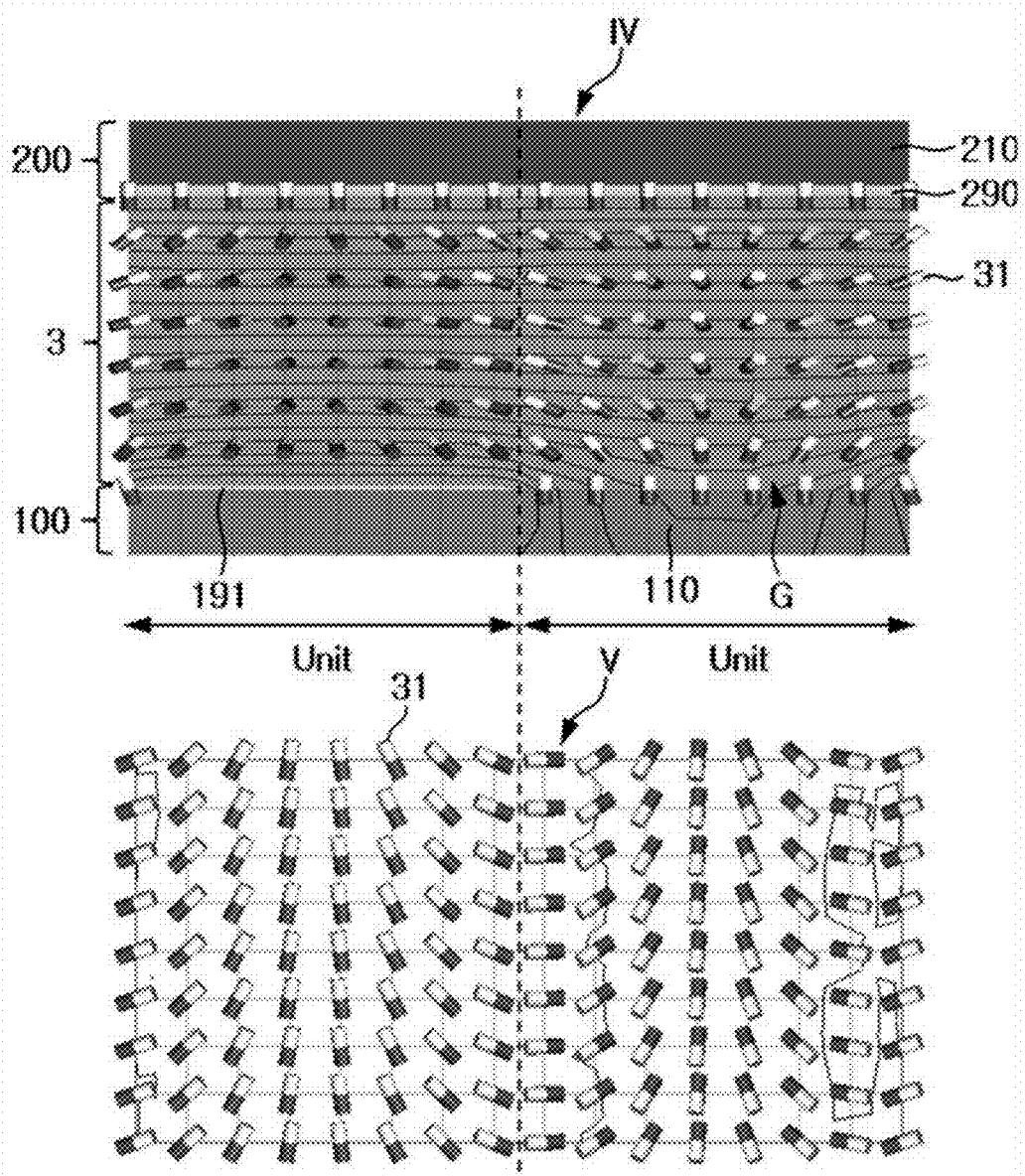
FIG. 17 shows a cross-sectional view with respect to the plane IV of FIG. 15 and a cross-sectional view with respect to the plane V of FIG. 15 and shows the arrangement of the liquid crystal molecules that are stabilized after the voltage difference is imparted to the first plate and the second plate of the optical modulation device shown in FIG. 15.

FIG. 15 shows a perspective view of an optical modulation device according to an exemplary embodiment of the present invention, FIG. 16 shows a cross-sectional view with respect to the plane IV of FIG. 15 and a cross-sectional view with respect to the plane V of FIG. 15 and shows an arrangement of liquid crystal molecules when no voltage difference is imparted to a first plate and a second plate of the optical modulation device shown in FIG. 15, and FIG. 17 shows a cross-sectional view with respect to the plane IV of FIG. 15 and a cross-sectional view with respect to the plane V of FIG. 15 and shows an arrangement of the liquid crystal molecules that are stabilized after a voltage difference is imparted to the first plate and the second plate of the optical modulation device shown in FIG. 15.

Referring to FIG. 15 to FIG. 17, the optical modulation device 1 according to the present exemplary embodiment substantially corresponds to the above-described optical modulation device according to an exemplary embodiment, but a configuration of a single unit can be different. According to the present exemplary embodiment, a single unit can be configured with (e.g., can be configured to include) a single first electrode 191 or a single space (G). Therefore, the single first electrode 191 and the space (G) that is adjacent to a side of the single first electrode 191 are two units.

Referring to FIG. 16, when no voltage difference is imparted between the first electrode 191 of the first plate 100 and the second electrode 290 of the second plate 200 of the optical modulation device 1, the liquid crystal molecules 31 are initially aligned in a direction that is substantially perpendicular to the surfaces of (e.g., to planes of) the first plate 100 and the second plate 200, and the first and second aligners 11 and 21 can impart a pre-tilt to the liquid crystal molecules 31 in the alignment directions R1 and R2 of the first plate 100 and the second plate 200 as described above.

Referring to FIG. 17, a voltage is applied to the first electrode 191, and a voltage that is different from the voltage applied to the first electrode 191 is applied to the second electrode 290. For example, a voltage that is less than the voltage applied to first electrode 191 can be applied to the second electrode 290. For example, 6 volts can be applied to the first electrode 191, and 0 volts can be applied to the second electrode 290.

An intensity of the electric field in a region that is adjacent to the first electrode 191 is stronger than an intensity of the electric field in a region that is adjacent to the second electrode 290 facing the first electrode 191 in the liquid crystal layer 3 corresponding to the first electrode 191, and an intensity of the electric field in a region that is adjacent to the first electrode 191 is weaker than an intensity of the electric field in a region that is adjacent to the second electrode 290 facing the first electrode 191 in the liquid crystal layer 3 corresponding to the space (G) adjacent to the first electrode 191 (i.e., the space (G) between two adjacent ones of the first electrodes 191).

A direction in which the liquid crystal molecules 31 of the region that is adjacent to the first electrode 191 are inclined determines an in-plane arrangement direction of the liquid crystal molecules 31 that correspond to the first electrode 191 in the liquid crystal layer 3 corresponding to the first electrode 191. Accordingly, the liquid crystal molecules 31 are inclined in an initial pre-tilt direction of the liquid crystal molecules 31 that are adjacent to the first plate 100 to form an in-plane arrangement in the region that corresponds to the first electrode 191.

The electric field in the region that is adjacent to the second electrode 290 is the strongest in the liquid crystal layer 3 corresponding to the space (G) so the liquid crystal molecules 31 are inclined in the initial pre-tilt direction of the liquid crystal molecules 31 that are adjacent to the second plate 200 to form an in-plane arrangement. The initial pre-tilt direction of the liquid crystal molecules 31 that are adjacent to the first plate 100 is opposite to the initial pre-tilt direction of the liquid crystal molecules 31 that are adjacent to the second plate 200 so, as shown in FIG. 17, the direction in which the liquid crystal molecules 31 corresponding to the first electrode 191 are inclined is opposite to the direction in which the liquid crystal molecules 31 corresponding to the space (G) are inclined when the above-described voltage is applied.

A ratio of a width of the first electrode 191 versus a width of the space (G) can be substantially 1:1, and without being restricted to this, the ratio can be appropriately established in consideration of various conditions, such as a height of a cell gap of the liquid crystal layer 3 or a voltage applied to the first electrode 191.

The liquid crystal molecules 31 are rotated and arranged for each unit in an in-plane manner so the azimuthal angle of the long axis of the liquid crystal molecules 31 can change or vary from 0 to 180 in the region corresponding to the width of the first electrode 191 or the width of the space (G).

A width of one unit of the optical modulation device 1 according to the present exemplary embodiment can be less than a width of one unit of the optical modulation device 1 shown with reference to FIG. 6 to FIG. 14.

An optical modulation device including liquid crystal according to an exemplary embodiment of the present invention will now be described with reference to FIG. 18 to FIG. 20. The constituent elements that are the same or substantially the same as those described with reference to the above exemplary embodiment will have the same reference numerals and will not be described again.

Figure 18:
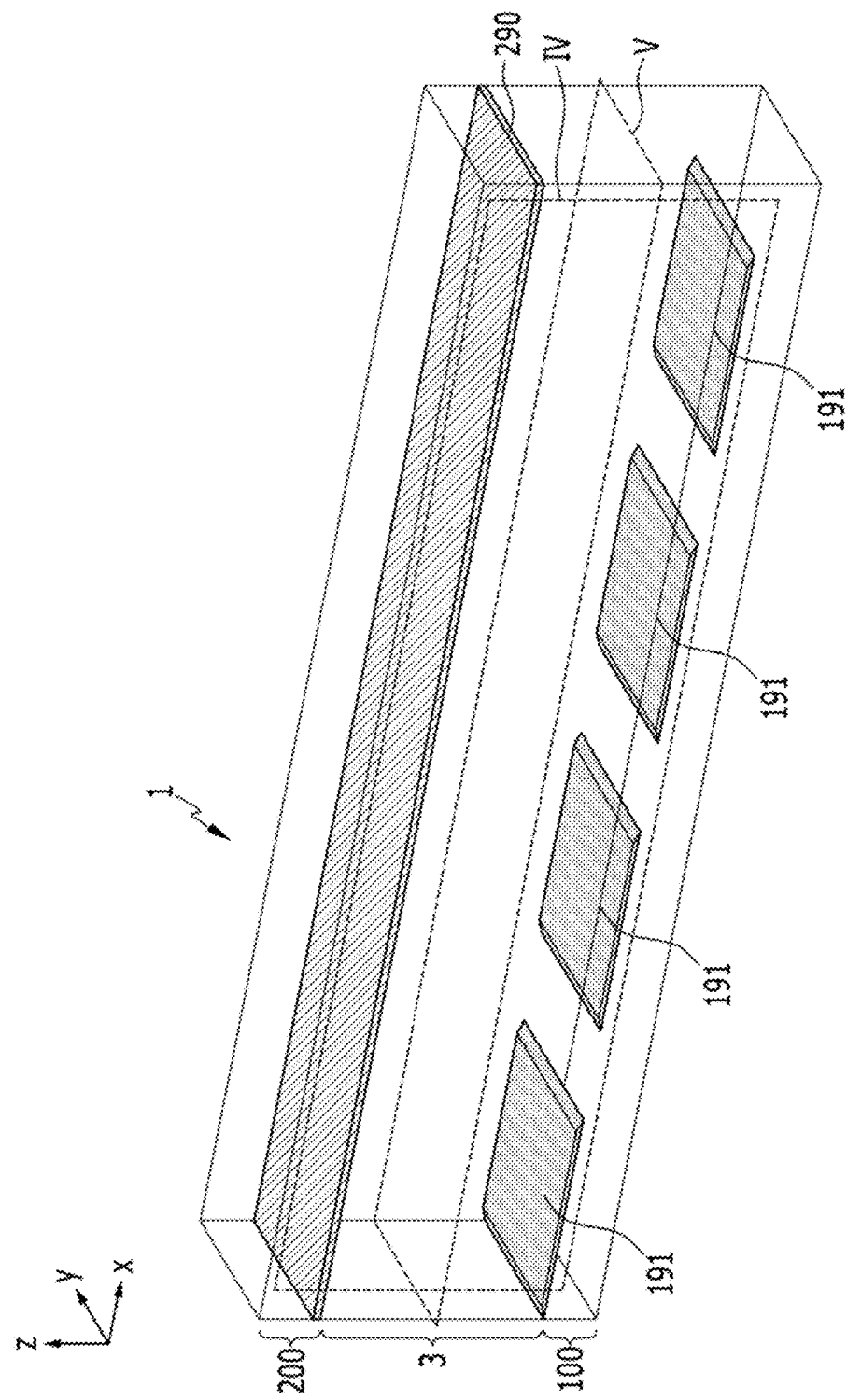
FIG. 18 shows a perspective view of an optical modulation device according to an exemplary embodiment of the present invention.
Figure 19:
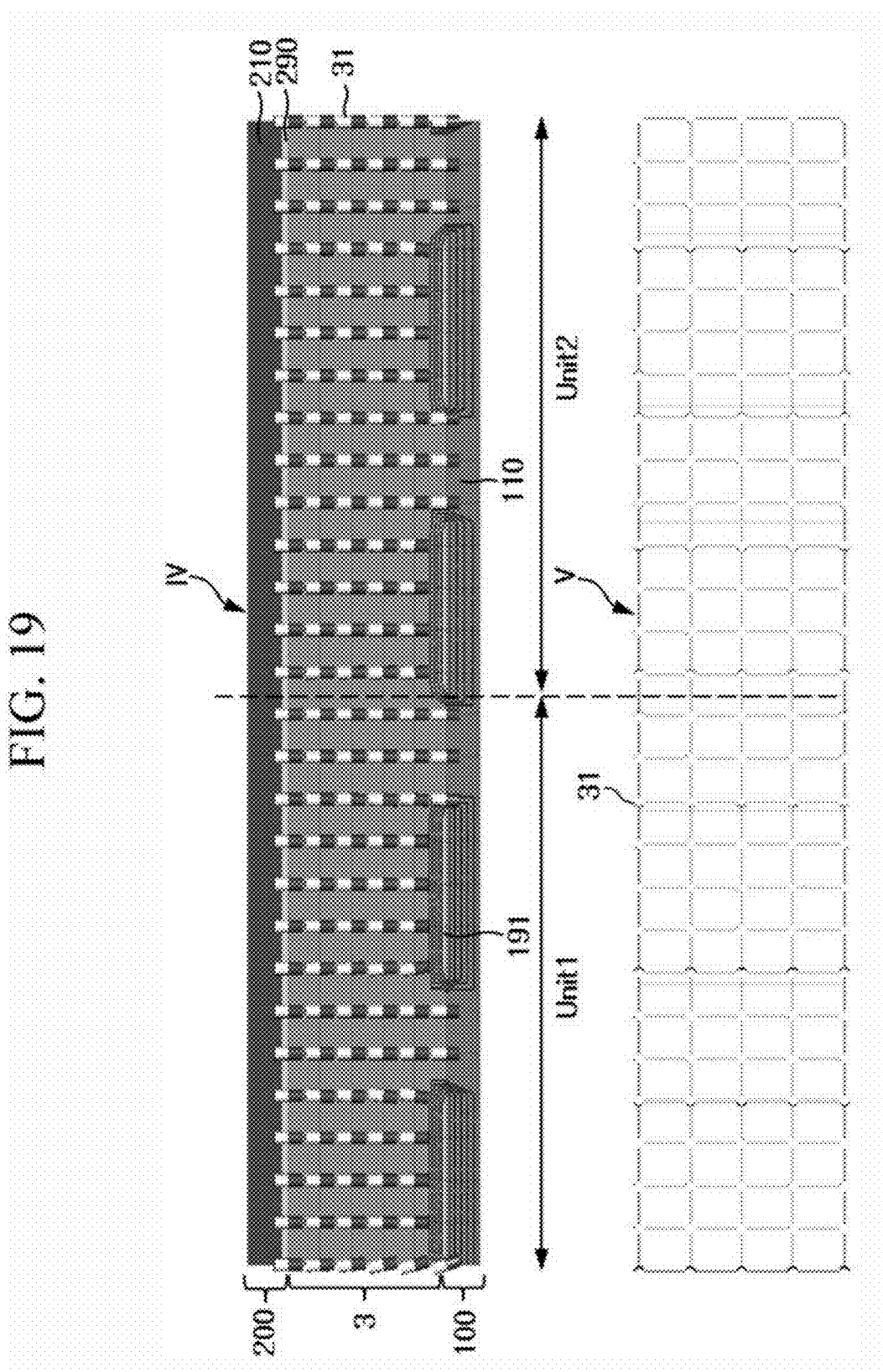
FIG. 19 shows a cross-sectional view with respect to the plane IV of FIG. 18 and a cross-sectional view with respect to the plane V of FIG. 18 and shows an arrangement of liquid crystal molecules when no voltage difference is imparted to a first plate and a second plate of the optical modulation device shown in FIG. 18.
Figure 20:
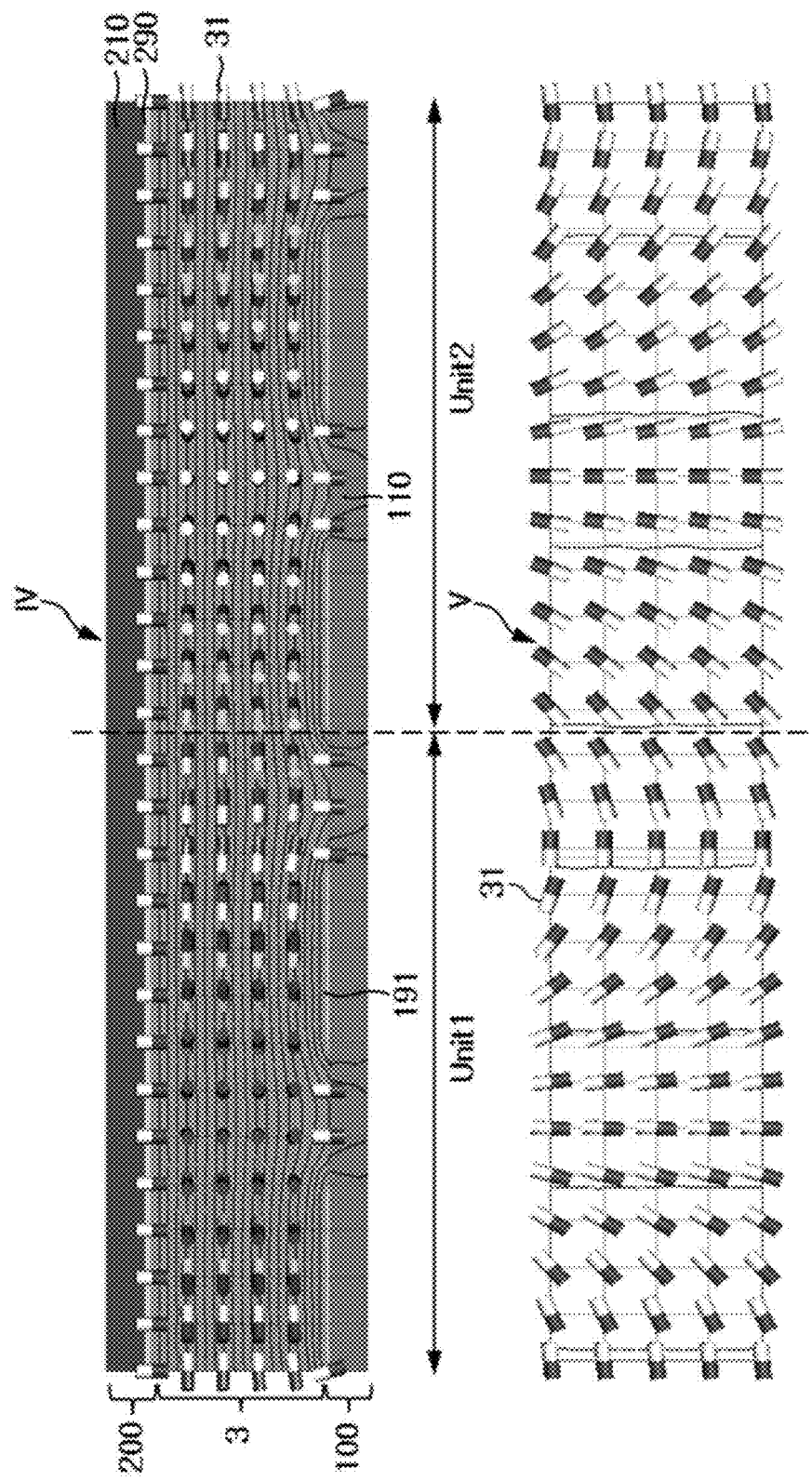
FIG. 20 shows a cross-sectional view with respect to the plane IV of FIG. 18 and a cross-sectional view with respect to the plane V of FIG. 18 and shows the arrangement of the liquid crystal molecules that are stabilized after the voltage difference is imparted to the first plate and the second plate of the optical modulation device shown in FIG. 18.

FIG. 18 shows a perspective view of an optical modulation device according to an exemplary embodiment of the present invention, FIG. 19 shows a cross-sectional view with respect to the plane IV of FIG. 18 and a cross-sectional view with respect to the plane V of FIG. 18 and shows an arrangement of the liquid crystal molecules when no voltage difference is imparted to a first plate and a second plate of the optical modulation device shown in FIG. 18, and FIG. 20 shows a cross-sectional view with respect to the plane IV of FIG. 18 and a cross-sectional view with respect to the plane V of FIG. 18 and shows the arrangement of the liquid crystal molecules that are stabilized after a voltage difference is imparted to the first plate and the second plate of the optical modulation device shown in FIG. 18.

Referring to FIG. 18 to FIG. 20, most of the optical modulation device 1 according to the present exemplary embodiment corresponds to the optical modulation device according to the above-described exemplary embodiment except for a configuration of each unit. According to the present exemplary embodiment, each of the units (e.g., unit 1 and unit 2) include a plurality of first electrodes 191 and a space that is adjacent to one side of each first electrode 191. FIG. 18 to FIG. 20 show an example of each of the units (e.g., unit 1 and unit 2) including two first electrodes 191.

Referring to FIG. 19, when no voltage difference is imparted between the first electrodes 191 of the first plate 100 and the second electrode 290 of the second plate 200 of the optical modulation device 1, the liquid crystal molecules 31 are initially aligned in a direction that is substantially perpendicular to surfaces of the first plate 100 and the second plate 200, and as described above, a pre-tilt of the liquid crystal molecules 31 can be configured according to the alignment directions R1 and R2 of the first plate 100 and the second plate 200.

Referring to FIG. 20, different voltages can be applied to the first electrodes 191 of the neighboring units (e.g., unit 1 and unit 2). Substantially identical voltages or voltages having a voltage difference (e.g., a predetermined voltage difference) can be applied to the plurality of first electrodes 191 included in one of the units (e.g., unit 1 or unit 2). For example, 6 volts can be supplied to each of the first electrodes 191 included in one unit, and 5 volts can be supplied to each of the first electrodes 191 included in the neighboring unit. Differing from this, 6 volts can be supplied to one first electrode 191 included in one unit, 5 volts can be supplied to another first electrode 191 included in the one unit, 4 volts can be supplied to one first electrode 191 included in a neighboring unit, and 5 volts can be supplied to the other first electrode 191 included in the neighboring unit. A voltage that is different from that of the first electrode 191, such as 0 volts, can be supplied to the second electrode 290.

Accordingly, an intensity of the electric field in the region that is adjacent to the first plate 100 is stronger than an intensity of the electric field in the region that is adjacent to the second plate 200 in the liquid crystal layer 3 corresponding to the first unit (e.g., unit 1), and an intensity of the electric field in the region that is adjacent to the first plate 100 is weaker than an intensity of the electric field in the region that is adjacent to the second plate 200 in the liquid crystal layer 3 corresponding to the second unit (e.g., unit 2) that is adjacent to the first unit (e.g., unit 1).

The direction in which the liquid crystal molecules 31 of the region that is adjacent to the first plate 100 determines the in-plane arrangement direction of the liquid crystal molecules 31 in the liquid crystal layer 3 corresponding to the first unit (e.g., unit 1) so the liquid crystal molecules 31 are inclined in the initial pre-tilt direction of the liquid crystal molecules 31 that are adjacent to the first plate 100 to form an in-plane arrangement as shown in FIG. 20.

The electric field in the region that is adjacent to the second plate 200 is the strongest in the liquid crystal layer 3 corresponding to the second unit (e.g., unit 2) so the liquid crystal molecules 31 are inclined in the initial pre-tilt direction of the liquid crystal molecules 31 that are adjacent to the second plate 200 to form an in-plane arrangement as shown in FIG. 20. The initial pre-tilt direction of the liquid crystal molecules 31 that are adjacent to the first plate 100 is opposite to the initial pre-tilt direction of the liquid crystal molecules 31 that are adjacent to the second plate 200 so, as shown in FIG. 20, the direction in which the liquid crystal molecules 31 of the first unit (e.g., unit 1) are inclined is opposite to the direction in which the liquid crystal molecules 31 of the second unit (e.g., unit 2) are inclined when the above-described voltage is applied.

The width of the first electrode 191 can be constant.

The liquid crystal molecules 31 are rotated and arranged in an in-plane manner for each of the units (e.g., unit 1 and unit 2), and the azimuthal angle of the long axis of the liquid crystal molecules 31 can change or vary from about 0 to 180 degrees in each of the units (e.g., unit 1 and unit 2).

When a voltage difference (e.g., a predetermined voltage difference) is provided to the plurality of first electrodes 191 included in one of the units (e.g., unit 1 or unit 2), the electric field between the adjacent units (e.g., unit 1 and unit 2) gradually changes or varies (e.g., is modified) such that the liquid crystal molecules 31 acquire a more stable spiral arrangement.

Widths of the units (e.g., unit 1 and unit 2) of the optical modulation device 1 according to the present exemplary embodiment can be greater than widths of the units of the above-described optical modulation device 1 shown in FIG. 6 to FIG. 14. In this embodiment, the units (e.g., unit 1 and unit 2) each include a plurality of first electrodes 191 so that it is possible to control an intensity of the electric field in more detail (e.g., so it is possible to finely control an intensity of the electric field) and it becomes easier to form a desired liquid crystal arrangement.

An optical modulation device including liquid crystal according to an exemplary embodiment of the present invention will now be described with reference to FIG. 21 and FIG. 22. The constituent elements that are the same or substantially the same as those described with reference to the above exemplary embodiment will have the same reference numerals and will not be described again.

Figure 21:
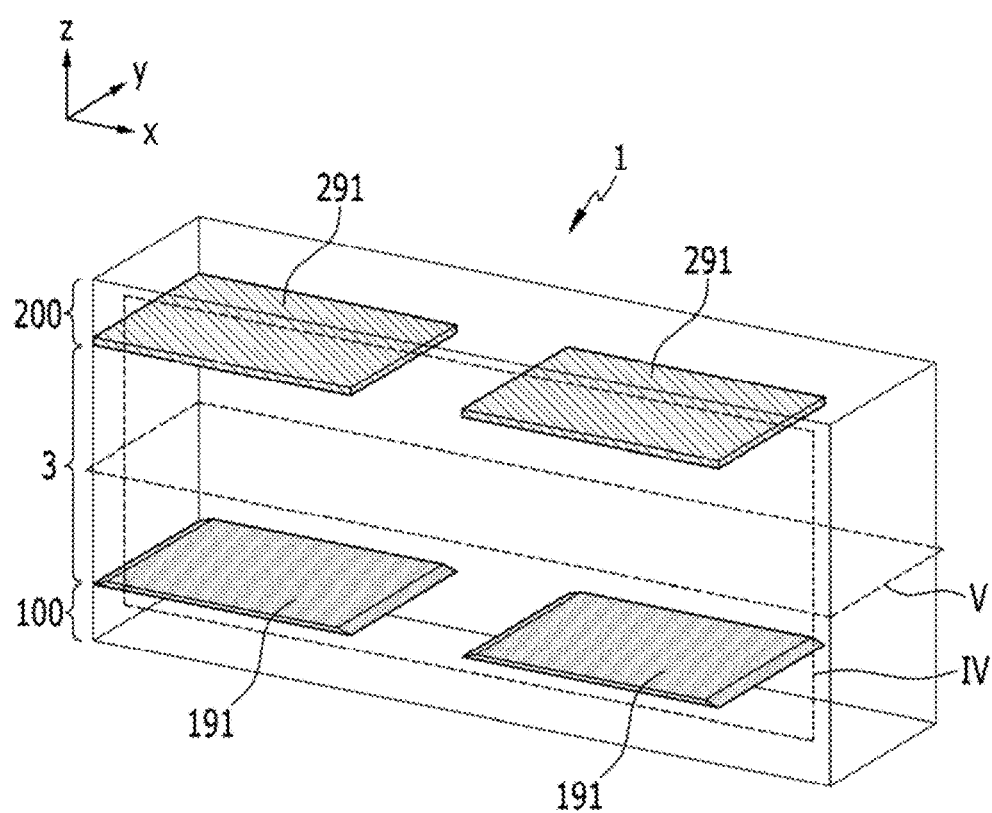
FIG. 21 shows a perspective view of an optical modulation device according to an exemplary embodiment of the present invention.
Figure 22:
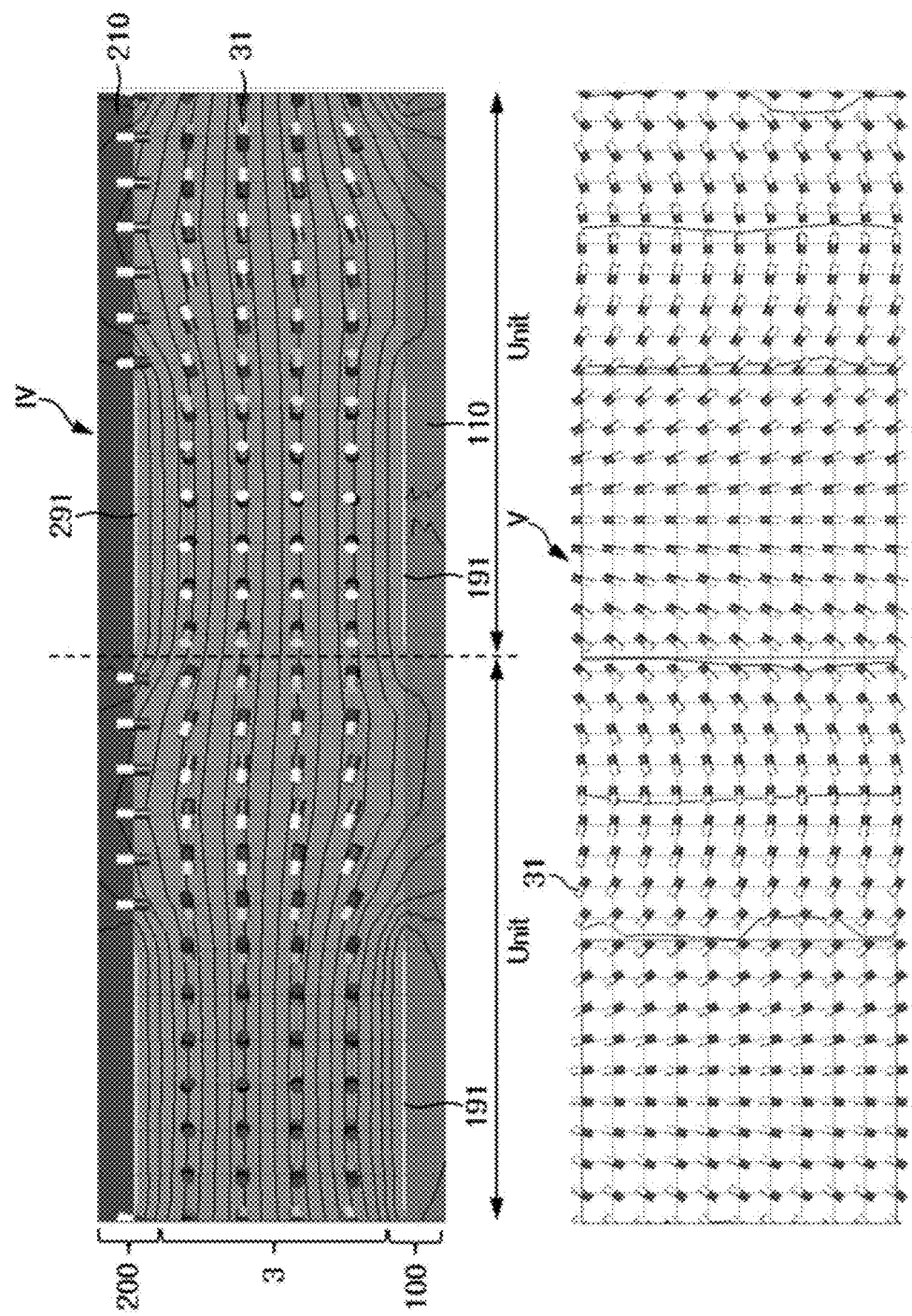
FIG. 22 shows a cross-sectional view with respect to the plane IV of FIG. 18 and a cross-sectional view with respect to the plane V of FIG. 18 and shows an arrangement of liquid crystal molecules that are stabilized after a voltage difference is imparted to a first plate and a second plate of the optical modulation device shown in FIG. 21.

FIG. 21 shows a perspective view of the optical modulation device according to an exemplary embodiment of the present invention, and FIG. 22 shows a cross-sectional view with respect to the plane IV of FIG. 21 and a cross-sectional view with respect to the plane V of FIG. 21 and shows an arrangement of liquid crystal molecules that are stabilized after a voltage difference is imparted to a first plate and a second plate of the optical modulation device shown in FIG. 21.

Referring to FIG. 21 and FIG. 22, most of the optical modulation device 1 according to the present exemplary embodiment corresponds to the optical modulation device 1 described with reference to FIG. 6 to FIG. 14 except for the configuration of the second electrode 290 of the second plate 200. According to the present exemplary embodiment, the second electrode provided on the second plate 200 can be formed not as a whole plate (e.g., a single unit) but as a plurality of second electrodes 291. The second electrodes 291 can be arranged along a direction that is parallel to the direction in which the first electrodes 191 are arranged, and the second electrodes 291 can extend in a direction that is perpendicular to the direction along which they are arranged.

Each unit can include a single second electrode 291 as shown in FIG. 21 and FIG. 22. Differing from this, each unit can include a plurality of second electrodes 291 or a unit can include the second electrode 291 and a unit not including the second electrode 291 can be alternately arranged as a plurality of units.

Each of the plurality of second electrodes 291 can be independently driven (e.g., each of the plurality of second electrodes 291 can receive additional voltage).

According to the present exemplary embodiment, a fringe field can be generated at an edge side of the patterned second electrodes 291 of the second plate 200 so a control force for arranging the liquid crystal molecules 31 in a desired direction is increased to further increase efficiency of the optical modulation device 1 as a phase delay unit. Further, the plurality of second electrodes 291 can be independently driven to increase freedom for using the optical modulation device 1 for other functions.

Referring to FIG. 22, the voltage supplied to the first electrodes 191 of the first plate 100 may correspond to the exemplary embodiment shown in FIG. 6 to FIG. 14. A same voltage or different voltages can be supplied to each of the plurality of second electrodes 291 of the second plate 200. FIG. 21 and FIG. 22 exemplify a case in which 0 volts is applied to each of the second electrodes 291.

According to the present exemplary embodiment, when the voltage is applied to the first electrode 191 and the second electrode 291, the liquid crystal molecules 31 are arranged in a very similar state in which the voltage difference is supplied to the first plate 100 and the second plate 200 in the exemplary embodiment shown with reference to FIG. 6 to FIG. 14. In this embodiment, the fringe field induced by the edge sides of the second electrodes 291 further increases arrangement efficiency of the liquid crystal molecules 31.

According to an exemplary embodiment of the present invention, as shown in FIG. 21 and FIG. 22, the first electrodes 191 and the second electrodes 291 may be aligned with each other, but not being restricted to this, the first electrodes 191 and the second electrodes 291 may be disposed in an unmatching manner (e.g., may be offset from each other). For example, respective ones of the first electrodes 191 and ones of the second electrodes 291 can be disposed such that each second electrode 291 may face a region between two neighboring ones of first electrodes 191.

A pitch of the plurality of first electrodes 191 may correspond to a pitch of the plurality of second electrodes 291.

An optical modulation device including liquid crystal according to an exemplary embodiment of the present invention will now be described with reference to FIG. 23 to FIG. 26. The constituent elements that are the same or substantially the same as those described with reference to the above exemplary embodiment will have the same reference numerals and will not be described again.

Figure 23:
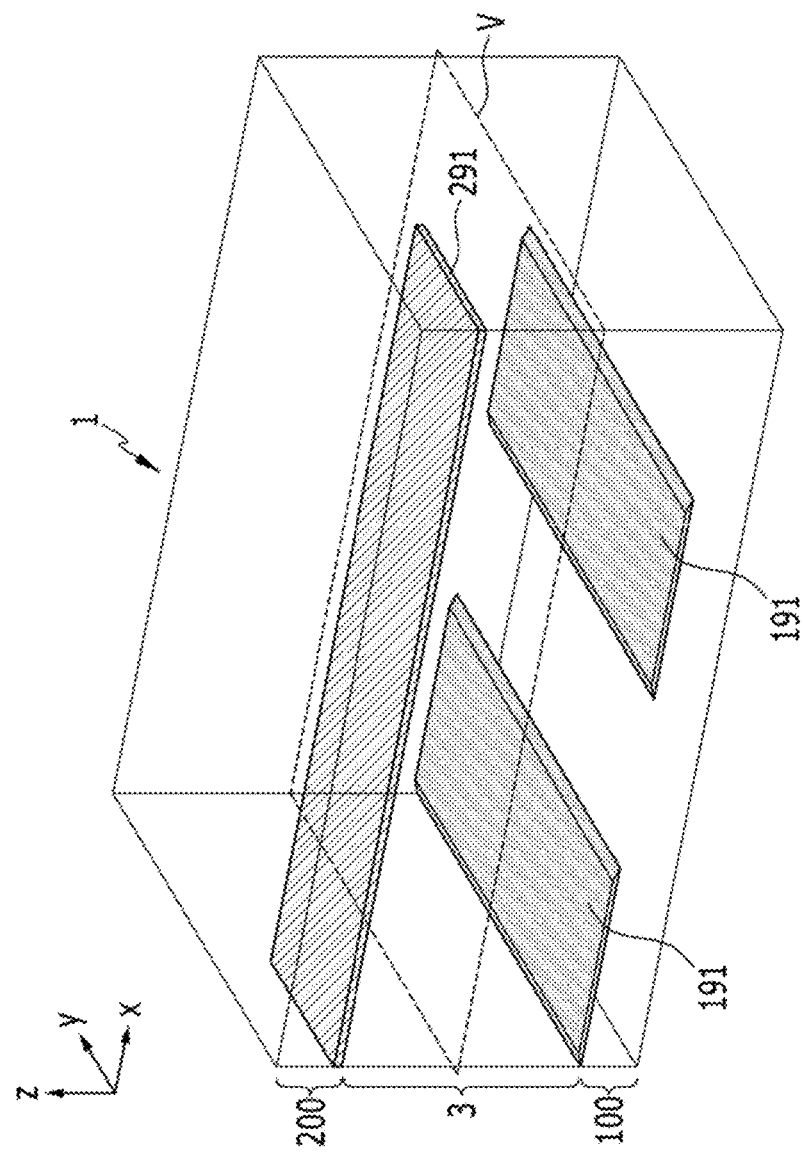
FIG. 23 shows a perspective view of an optical modulation device according to an exemplary embodiment of the present invention.
Figure 24:
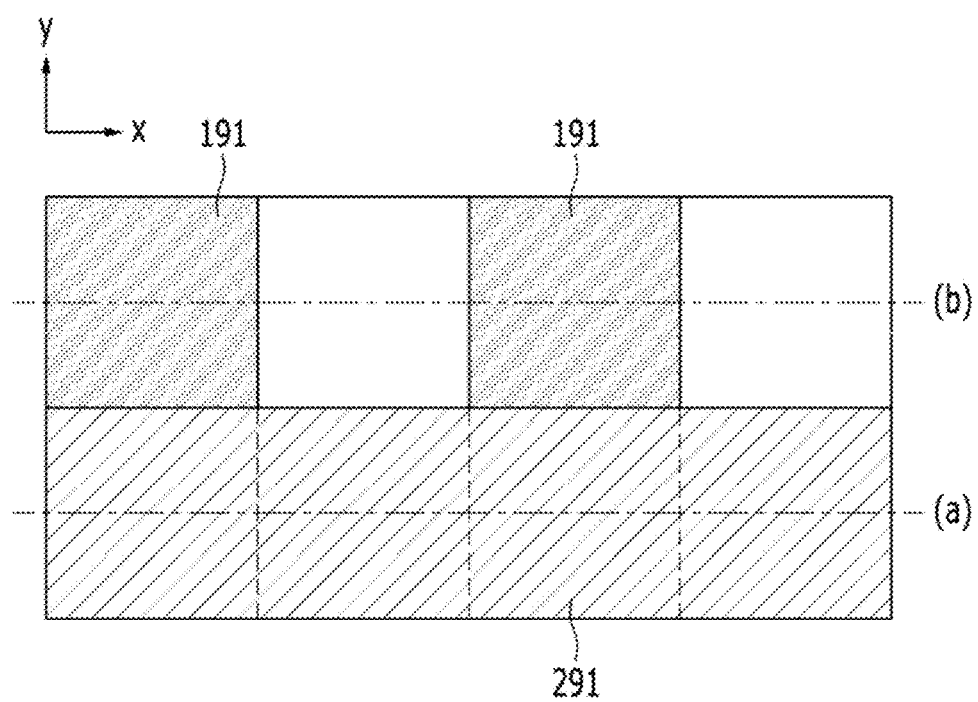
FIG. 24 shows a top plan view of the optical modulation device shown in FIG. 23.
Figure 25:
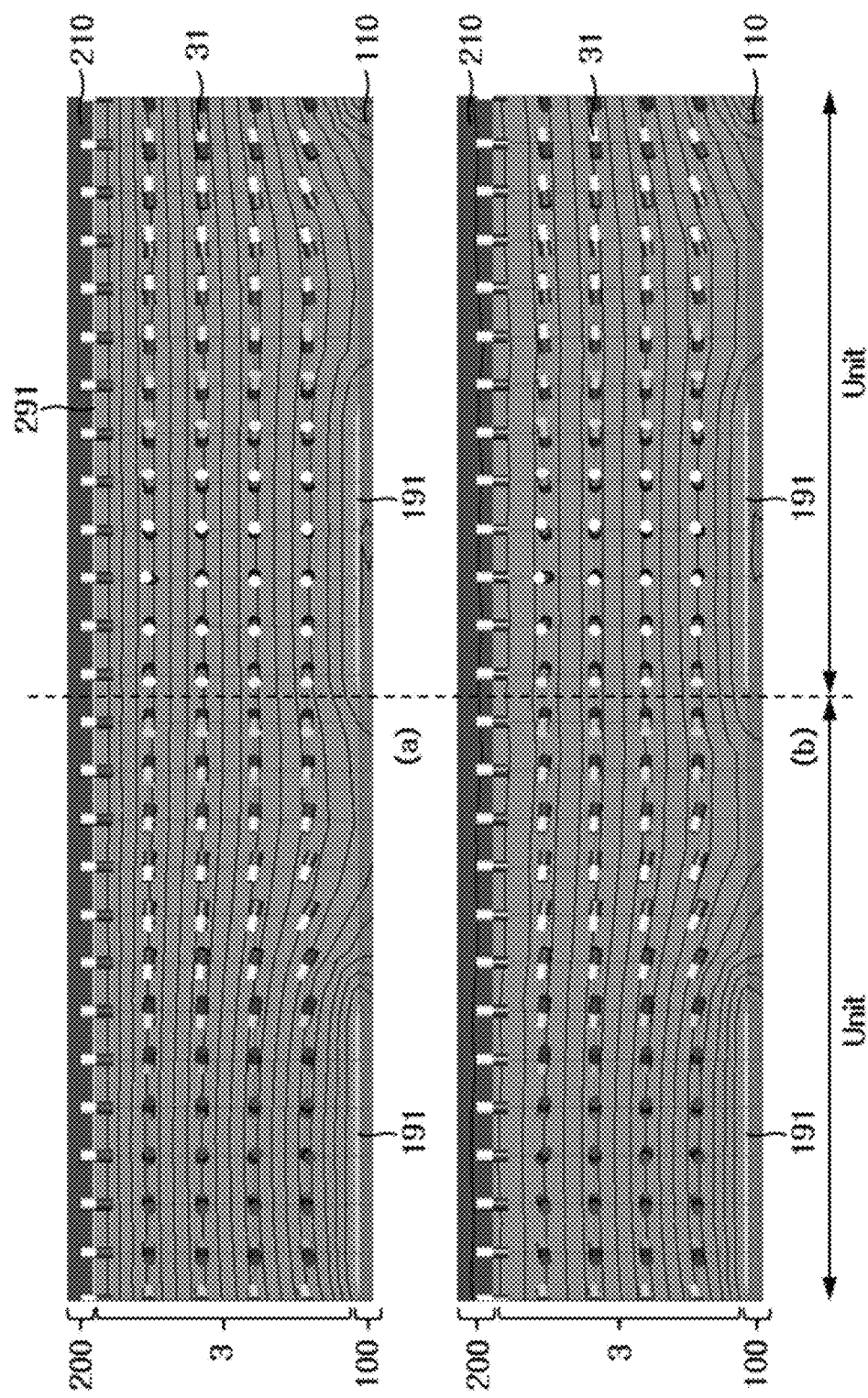
FIG. 25 shows a cross-sectional view of an arrangement of liquid crystal molecules that are stabilized after a voltage difference is imparted to a first plate and a second plate of the optical modulation device shown in FIG. 23 and FIG. 24 with respect to the lines (a) and (b) of FIG. 24.
Figure 26:
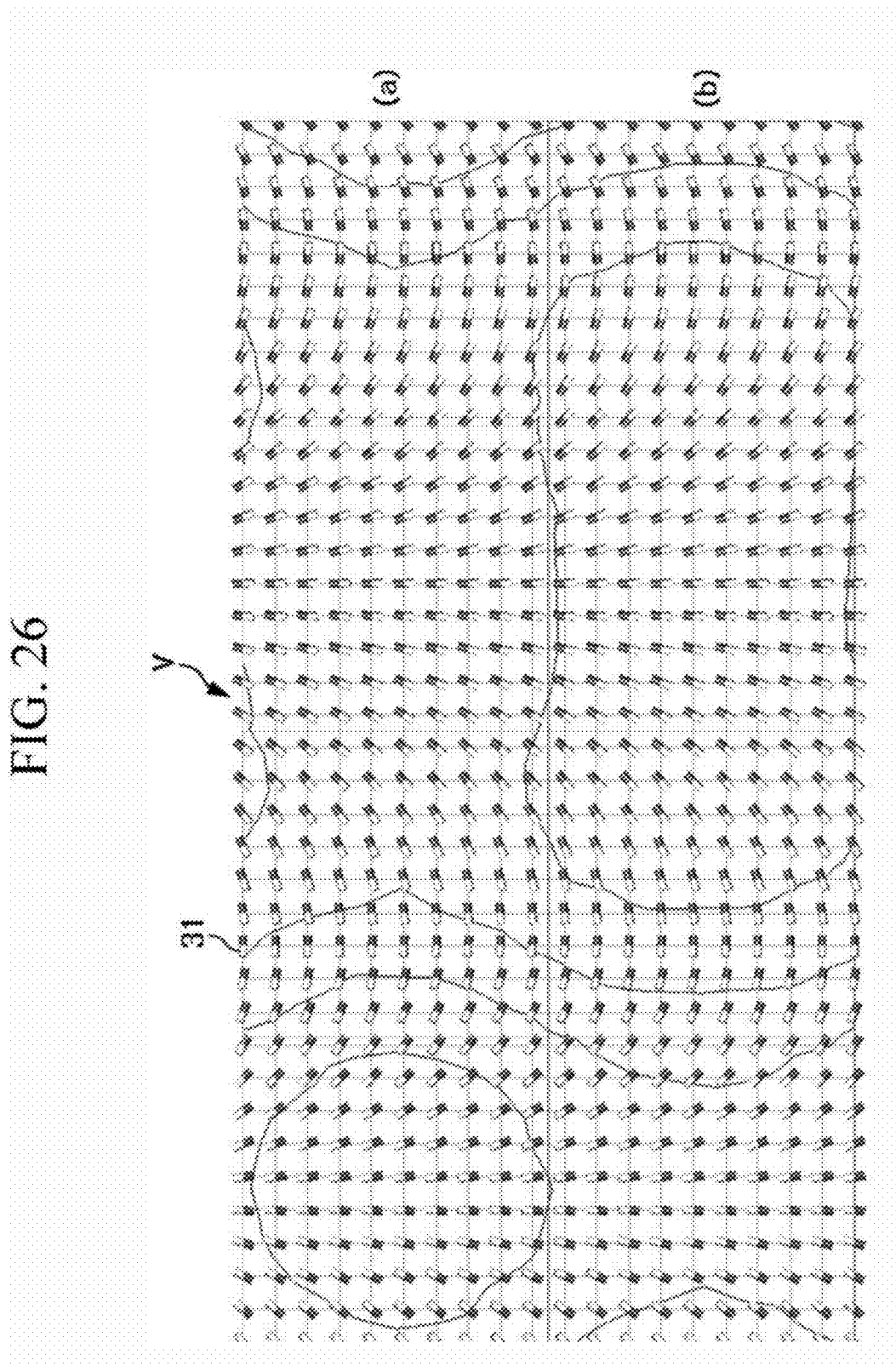
FIG. 26 shows a cross-sectional view of the arrangement of the liquid crystal molecules that are stabilized after the voltage difference is imparted to the first plate and the second plate of the optical modulation device shown in FIG. 23 and FIG. 24 with respect to the plane V of FIG. 23.

FIG. 23 shows a perspective view of the optical modulation device according to an exemplary embodiment of the present invention, FIG. 24 shows a top plan view of the optical modulation device shown in FIG. 23, FIG. 25 shows a cross-sectional view of an arrangement of liquid crystal molecules that are stabilized after a voltage difference is imparted to a first plate and a second plate of the optical modulation device shown in FIG. 23 and FIG. 24 with respect to the lines (a) and (b) of FIG. 24, and FIG. 26 shows a cross-sectional view of the arrangement of the liquid crystal molecules that are stabilized after the voltage difference is imparted to the first plate and the second plate of the optical modulation device shown in FIG. 23 and FIG. 24 with respect to the plane V of FIG. 23.

Referring to FIG. 23 and FIG. 24, most of the optical modulation device 1 according to the present exemplary embodiment corresponds to the optical modulation device according to the exemplary embodiment shown in FIG. 6 to FIG. 14 except for the configuration of the second electrode of the second plate 200. According to the present exemplary embodiment, the second electrode can be a plurality of second electrodes 291, and the second electrodes 291 can be arranged along a direction that is perpendicular to the direction along which the first electrodes 191 are arranged, for example, the y-axis direction. In this embodiment, the second electrodes 291 can extend in the direction that is perpendicular to the direction in which they are arranged, for example, the x-axis direction.

Accordingly, a voltage can be sequentially applied to the second electrodes 291 arranged along the y-axis direction through scanning, and each of the second electrodes 291 can independently receive the voltage. In the present exemplary embodiment, the embodiment in which a same voltage is supplied to each of the plurality of second electrodes 291 will be described.

Referring to FIG. 24, a region in which the first electrode 191 overlaps the second electrode 291 and a region in which the first electrode 191 does not overlap the second electrode 291 can be alternately arranged.

Referring to FIG. 25 and FIG. 26, the same voltage as that described in the exemplary embodiment shown in FIG. 6 to FIG. 14 can be applied to the first electrodes 191 of the first plate 100. For example, when a first voltage (e.g., 6 V) is applied to the first electrode 191 of one of the units, a second voltage (e.g., 4 V) that is greater than or less than the first voltage is applied to the first electrode 191 of a neighboring unit, and a third voltage (e.g., 0 V) that is less than the first voltage and the second voltage is applied to the second electrodes 291 of the second plate 200. The liquid crystal molecules 31 in the region corresponding to the cross-sectional view with respect to the line (a) of FIG. 24 undergo the process according to the exemplary embodiment shown in FIG. 6 to FIG. 10 and form an in-plane spiral arrangement. There is no electrode on the second plate 200 in the region corresponding to the cross-sectional view with respect to the line (b) of FIG. 24, and being influenced by movement of the liquid crystal molecules 31 of the region corresponding to the line (a), the liquid crystal molecules 31 rotate in a mostly like manner of the region corresponding to the cross-sectional view with respect to the line (a).

A size and a ratio of the widths of and the gaps between the second electrodes 291 is controlled so that an arrangement of the liquid crystal molecules 31 in the region corresponding to the line (b) may be substantially the same as an arrangement of the liquid crystal molecules 31 in the region corresponding to the line (a).

A method for driving an optical modulation device according to an exemplary embodiment of the present invention will now be described with reference to many above-described drawings and FIG. 27.

Figure 27:
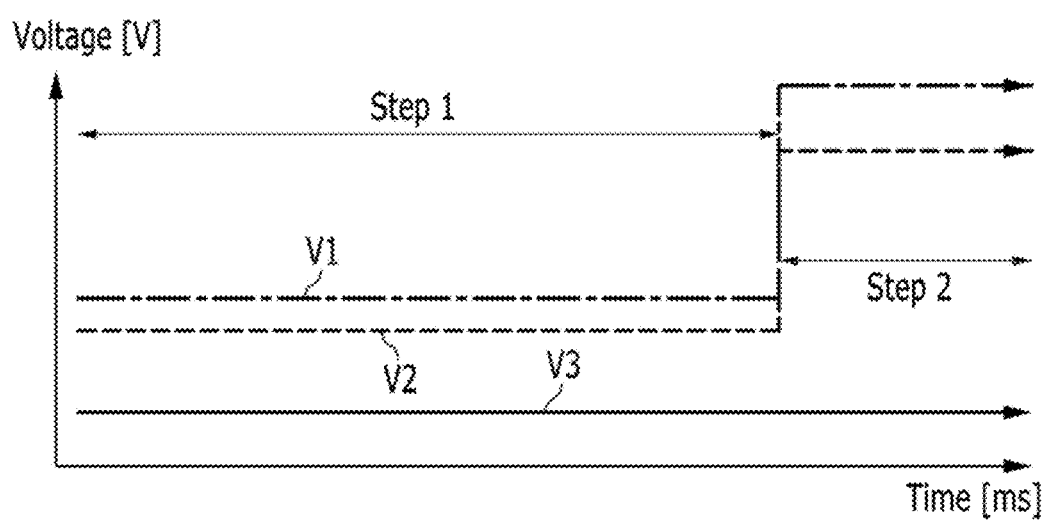
FIG. 27 shows a waveform diagram of a driving signal applied to an electrode of an optical modulation device according to an exemplary embodiment of the present invention.

FIG. 27 shows a waveform diagram of a driving signal applied to an electrode of an optical modulation device according to an exemplary embodiment of the present invention.

It has been described in an exemplary embodiment of the present invention that the voltage applied to the first electrodes 191 has one level when the optical modulation device 1 functions as a phase delay unit, but without being restricted to this, two voltages can be sequentially applied. In this embodiment, the two voltages can be applied in a stepwise manner.

Referring to FIG. 27, when a voltage supplied to one first electrode 191 or 191a from among the neighboring first electrodes 191 is referred to as a first voltage V1, a voltage applied to another first electrode 191 or 191b is referred to as a second voltage V2, and a voltage applied to the second electrodes 290 and 291 is referred to as a third voltage V3, the first voltage V1 and the second voltage V2 can have different levels (e.g., the first and second voltages V1 and V2 can be different) for at least two steps (e.g., Step 1 and Step 2). The first voltage V1 and the second voltage V2 have different voltage levels at all steps. For example, the first voltage V1 can be 3 volts at the first step (e.g., Step 1) and can be 6 volts at the second step (e.g., Step 2), and the second voltage V2 can be 2 volts at the first step (e.g., Step 1) and can be 4 volts on at second step (e.g., Step 2). In this embodiment, the third voltage V3 can be 0 volts (e.g., can be 0 volts at the first and second steps).

As described, when the voltage supplied to the first electrodes (191, 191a, 191b) increases not abruptly but in a stepwise manner, collision among the liquid crystal molecules 31 induced by an abrupt movement of the liquid crystal molecules 31 is reduced and a region in which the liquid crystal molecules 31 are scattered is reduced to generate a stable in-plane spiral arrangement.

A size and a number of steps of the first voltage V1 and the second voltage V2 are modifiable in various suitable manners according to various design conditions of the optical modulation device 1, such as a height of a cell gap of the liquid crystal layer 3.

According to another exemplary embodiment of the present invention, the third voltage V3 of the second electrodes 290 or 291 can have a voltage level that is variable according to the steps (e.g., Step 1 and Step 2).

The method for driving according to the exemplary embodiment described with reference to FIG. 27 is applicable to the optical modulation device 1 according to the above-described exemplary embodiments.

Figure 28:
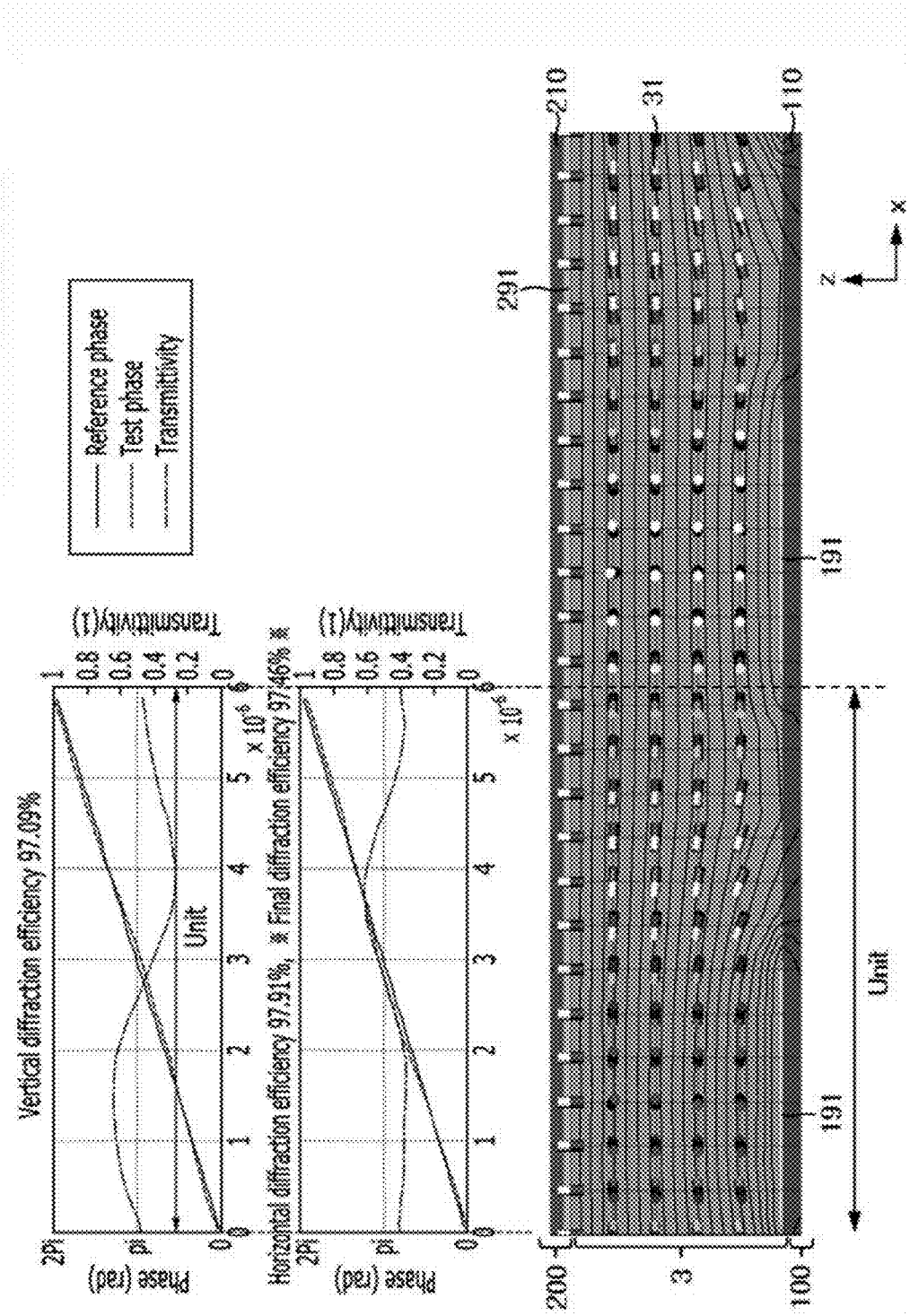
FIG. 28 and FIG. 29 respectively show a graph for indicating a diffraction efficiency of an optical modulation device according to exemplary embodiments of the present invention.
Figure 29:
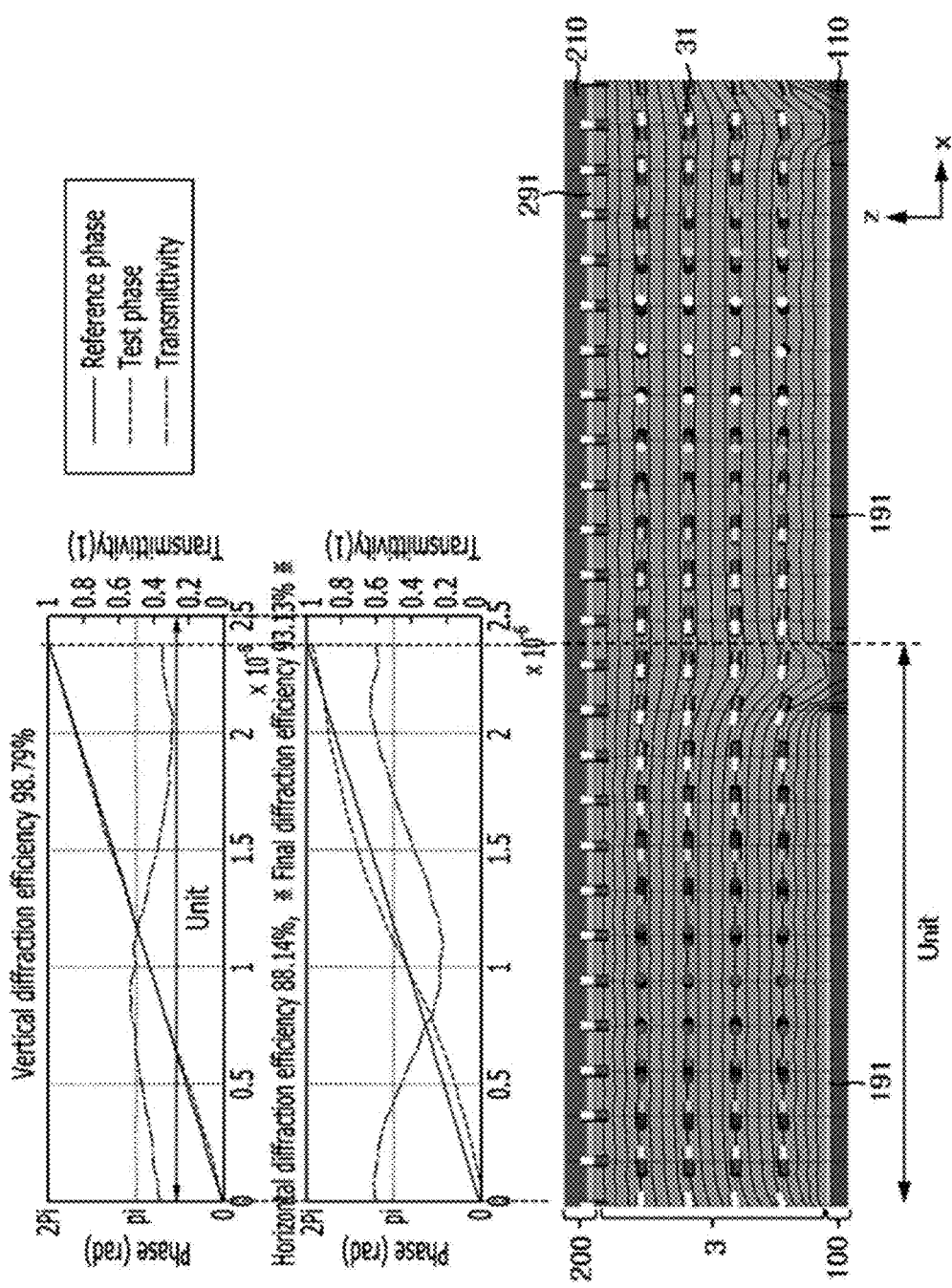

FIG. 28 and FIG. 29 show graphs of diffraction efficiency when circularly polarized light is input to the optical modulation device 1 according to an exemplary embodiment of the present invention.

Regarding FIG. 28, when a pitch of the unit of the optical modulation device 1 according to the above-described exemplary embodiment is substantially 6 μm, a phase delay value (Δnd) of the cell gap is substantially a half-wave length, the circularly polarized incident light is divided into components in perpendicular (e.g., vertical) and horizontal directions, and diffraction efficiency is calculated. All test phases show a phase change approaching a reference phase, indicating substantially 97.09% vertical diffraction efficiency and substantially 97.91% horizontal diffraction efficiency.

Regarding FIG. 29, when the pitch of the unit of the optical modulation device 1 according to the above-described exemplary embodiment is substantially 24 μm, the phase delay value (Δnd) of the cell gap is substantially a half-wave length, the circularly polarized incident light is divided into components in perpendicular (e.g., vertical) and horizontal directions, and diffraction efficiency is calculated. All test phases show a phase change approaching a reference phase, indicating substantially 98.79% vertical diffraction efficiency and substantially 88.14% horizontal diffraction efficiency.

The optical modulation device 1 according to an exemplary embodiment of the present invention is usable for various kinds of optical devices. For example, the optical modulation device 1 can function as a lens by combining prisms with the optical modulation device.

Figure 30:
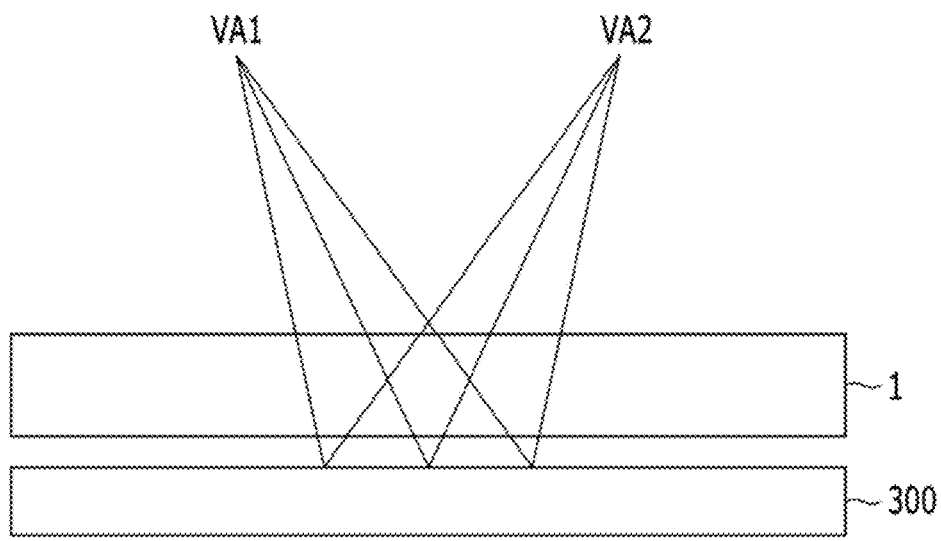
FIG. 30 and FIG. 31 show an example of an optical device using an optical modulation device according to an exemplary embodiment of the present invention and show a schematic structure of a stereoscopic image display device and a method for displaying a 2D image and a 3D image.
Figure 31:
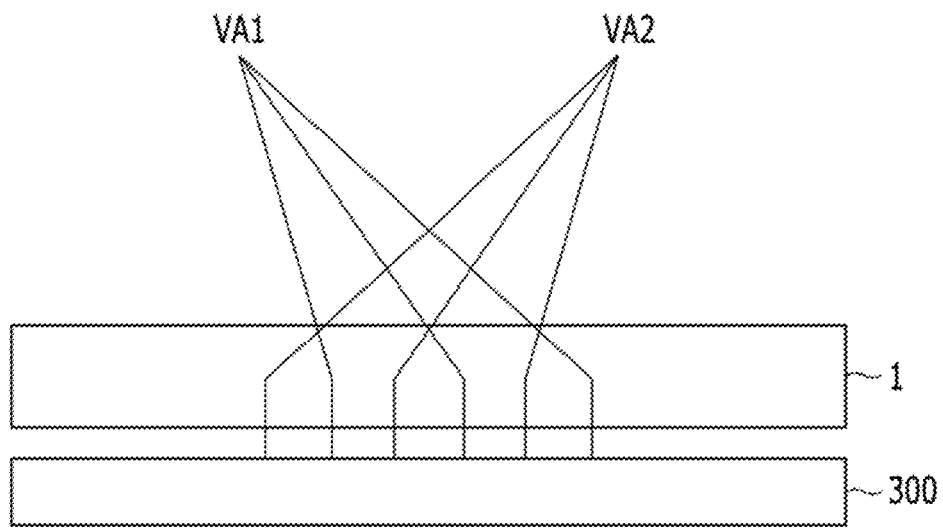

FIG. 30 and FIG. 31 show an example of an optical device using an optical modulation device according to an exemplary embodiment of the present invention and show a schematic structure of a stereoscopic image display device and a method for displaying a 2D image and a 3D image.

Referring to FIG. 30 and FIG. 31, the optical device according to an exemplary embodiment of the present invention includes, as a stereoscopic image display device, a display panel 300 and an optical modulation device 1 provided at a front of the display panel 300 at which images are displayed by the display panel 300. The display panel 300 includes a plurality of pixels for displaying images that are arranged in a matrix form.

The display panel 300 displays a two-dimensional (2D) image of each frame in a 2D mode as shown in FIG. 30, and the display panel 300 divides images that correspond to various images (e.g., various times) such as right-eye images and left-eye images by a spatial division method and displays them in a three-dimensional (3D) mode as shown in FIG. 31. In the 3D mode, one group (e.g., one part) of the plurality of pixels of the display panel 300 can display an image at a certain (e.g., predetermined) time, and another group of the plurality of pixels can display an image corresponding to another time. A number of the times can be at least two.

The optical modulation device 1 can be realized with a prism or a lens for dividing the image displayed by the display panel 300 according to respective times and can be switched on/off. When the optical modulation device 1 is turned on, a stereoscopic image display device is operated in the 3D mode, and as shown in FIG. 31, a 3D image can be formed with a plurality of prisms or lenses for refracting the image displayed by the display panel 300 and displaying the image at the corresponding time. When the optical modulation device 1 is turned off, as shown in FIG. 30, the image displayed by the display panel 300 is not refracted but passed through and the 2D image is observed. The lens realized by the optical modulation device 1 can be a diffraction lens.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims and their equivalents.

What is claimed is:

1. An optical modulation device comprising:
    a first plate and a second plate facing the first plate; and
    a liquid crystal layer between the first plate and the second plate and comprising a plurality of liquid crystal molecules, wherein
    the first plate comprises a plurality of first electrodes and a first aligner, wherein
    the second plate comprises at least one second electrode and a second aligner, where
    portions of the first plate, the second plate, and the liquid crystal layer between the first and second plates are individual units, and wherein
    when an electric field is applied to the liquid crystal layer, a first voltage supplied to one of the first electrodes in a first unit from among the units varies in a stepwise manner from a first step voltage during a period of a first step to a second step voltage during a period of a second step, a second voltage supplied to another of the first electrodes in the first unit varies in the stepwise manner increasing from a third step voltage during the same period of the first step to a fourth step voltage during the same period of the second step, the second step voltage being greater than the first step voltage, and the fourth step voltage is different from the second step voltage and is greater than the third step voltage; which is different from the first step voltage.

2. The optical modulation device of claim 1, wherein when no electric field is applied to the liquid crystal layer, a pre-tilt direction of the liquid crystal molecules adjacent to the first plate is opposite about a line normal to a surface of the first plate to a pre-tilt direction of the liquid crystal molecules adjacent to the second plate.

3. The optical modulation device of claim 2, wherein when an electric field is applied to the liquid crystal layer, an intensity of the electric field in a region adjacent to the first electrode is greater than an intensity of the electric field in a region adjacent to the second electrode in the first unit.

4. The optical modulation device of claim 3, wherein an intensity of the electric field in a region adjacent to the first plate is less than an intensity of the electric field in a region adjacent to the second plate in a second unit from among the units and neighboring the first unit.

5. The optical modulation device of claim 4, wherein a respective one of the first electrodes is in each of the first unit and the second unit.

6. The optical modulation device of claim 5, wherein the voltage supplied to the first electrode in the first unit is greater than a voltage supplied to the first electrode in the second unit.

7. The optical modulation device of claim 4, wherein no first electrodes are in the second unit.

8. The optical modulation device of claim 4, wherein the plurality of first electrodes comprises at least four first electrodes, and
wherein at least two of the first electrodes are in each of the first unit and the second unit.

9. The optical modulation device of claim 8, wherein the voltage supplied to the first electrodes in the first unit is greater than a voltage supplied to the first electrodes in the second unit.

10. The optical modulation device of claim 4, wherein the second plate further comprises a plurality of second electrodes.

11. The optical modulation device of claim 10, wherein respective ones of the second electrodes are aligned with respective ones of the first electrodes.

12. The optical modulation device of claim 11, wherein the second electrodes are arranged along a direction along which the first electrodes are arranged.

13. The optical modulation device of claim 10, wherein the second electrodes are arranged along a direction which is substantially perpendicular to a direction along which the first electrodes are arranged.

14. The optical modulation device of claim 13, wherein regions in which ones of the first electrodes overlap ones of the second electrodes and regions in which ones of the first electrodes do not overlap ones of the second electrodes are alternately arranged.

15. An optical device comprising the optical modulation device of claim 1.

16. A method for driving an optical modulation device, the optical modulation device comprising a first plate and a second plate facing the first plate, the first plate comprising a plurality of first electrodes and the second plate comprises at least one second electrode, and a liquid crystal layer between the first plate and the second plate, wherein portions of the first plate, the second plate, and the liquid crystal layer between the first and second plates are individual units, the method comprising:
supplying a voltage to the first electrodes and to the at least one second electrode such that an intensity of an electric field in the liquid crystal layer in a region adjacent to the first plate and corresponding to one of the first electrodes in a first unit from among the units is greater than an intensity of the electric field in the liquid crystal layer in a region adjacent to the second plate, wherein
when an electric field is applied to the liquid crystal layer, a first voltage supplied to one of the first electrodes in the first unit varies in a stepwise manner increasing from a first step voltage during a period of a first step to a second step voltage during a period of a second step, a second voltage supplied to another of the first electrodes in the first unit varies in the stepwise manner increasing from a third step voltage during the same period of the first step to a fourth step voltage during the same period of the second step, the second step voltage being greater than the first step voltage, and the fourth step voltage is different from the second step voltage and is greater than the third step voltage, which is different from the first step voltage.

17. The method of claim 16, wherein the supplying of the voltage to the first electrodes and the at least one second electrode creates an intensity of the electric field in the liquid crystal layer in a region adjacent to the first plate that is less than an intensity of the electric field in the liquid crystal layer in a region adjacent to the second plate and in a second unit from among the units and neighboring the first unit.

18. The method of claim 17, wherein the voltage supplied to the first electrode in the first unit is greater than the voltage supplied to the first electrode in the second unit.

* * * * *